United States Patent [19]

Sherman et al.

[11] Patent Number: 4,791,570

[45] Date of Patent: Dec. 13, 1988

[54] GUIDE WIRE COMMUNICATION SYSTEM AND METHOD

[75] Inventors: Leigh E. Sherman, North Wales, Pa.; Gary L. Whatcott, Holladay, Utah; Richard M. Dicks, Salt Lake City, Utah; David C. Madsen, Sandy, Utah

[73] Assignee: Eaton-Kenway, Inc., Salt Lake City, Utah

[21] Appl. No.: 873,032

[22] Filed: Jun. 11, 1986

Related U.S. Application Data

[63] Continuation-in-part of Ser. No. 729,514, May 2, 1985, abandoned.

[51] Int. Cl.⁴ .............................................. G06F 15/48
[52] U.S. Cl. ............................... 364/436; 364/424.02; 180/168; 318/587
[58] Field of Search ................. 364/424, 436; 180/167, 180/168, 169; 318/587

[56] References Cited

U.S. PATENT DOCUMENTS

| | | | |
|---|---|---|---|
| 3,009,525 | 11/1961 | DeLiban | 180/82 |
| 3,147,817 | 9/1964 | DeLiban | 180/82 |
| 3,544,788 | 1/1969 | Guzik | 246/30 |
| 3,734,229 | 5/1973 | Comer | 180/98 |
| 4,023,753 | 5/1977 | Dobler | 364/436 |
| 4,215,759 | 8/1980 | Diaz | 180/168 |
| 4,284,160 | 8/1981 | DeLiban | 180/168 |
| 4,630,216 | 12/1986 | Tyler et al. | 180/168 |

OTHER PUBLICATIONS

IBM Technical Disclosure Bulletin, vol. 27, No. 4A, Sep. 1984, pp. 2037–2040, New York, U.S.; J. R. Shumate et al.: "Routing and tracking of automatically guided vehicle".

*Primary Examiner*—Gary Chin
*Attorney, Agent, or Firm*—Lynn G. Foster

[57] ABSTRACT

A guidance system for guiding a plurality of unmanned vehicles along guide wires. A plurality of data communication circuits are provided which form an extensive network. A traffic control computer composes a coded vehicle instruction for assigning tasks and allocates resources to said unmanned vehicles. The traffic control computer polls the status of each vehicle at varying time intervals and receives a response from said vehicle. The network connecting the computer and the communication circuits prevents reception of data transmissions from more than one vehicle at a time. Other messages are temporarily stored. Data transmitters generate low frequency, low power signals which have a high data transmission rate. Digital data is converted at the transmitters into cosine waveforms of selected frequencies. The cosine waveforms are transposed into sine waveforms at receivers. Low impedance or high impedance characteristics are imposed upon the guide wires. A low frequency, high gain transmit antenna for each vehicle is prorated.

32 Claims, 18 Drawing Sheets

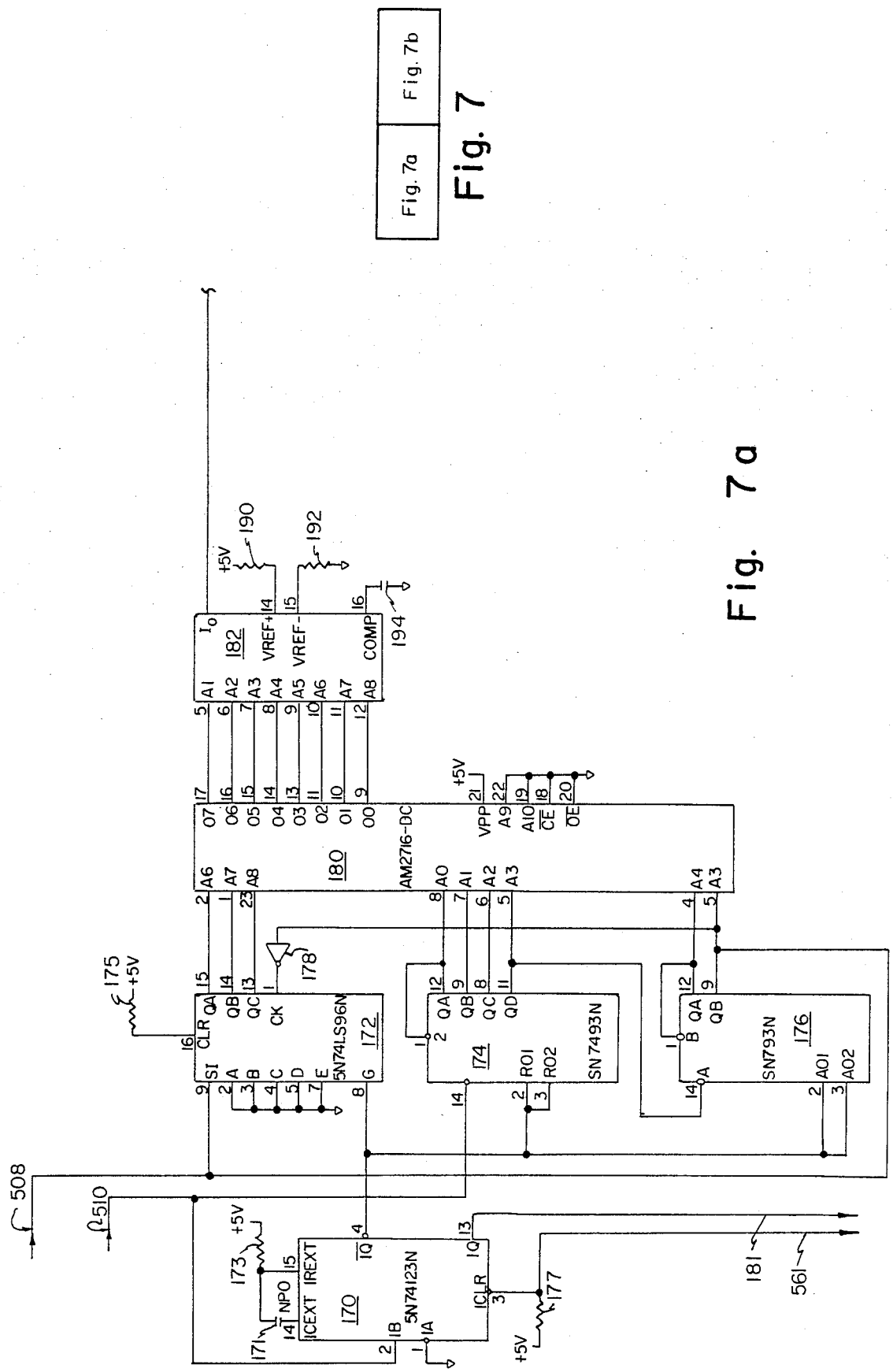

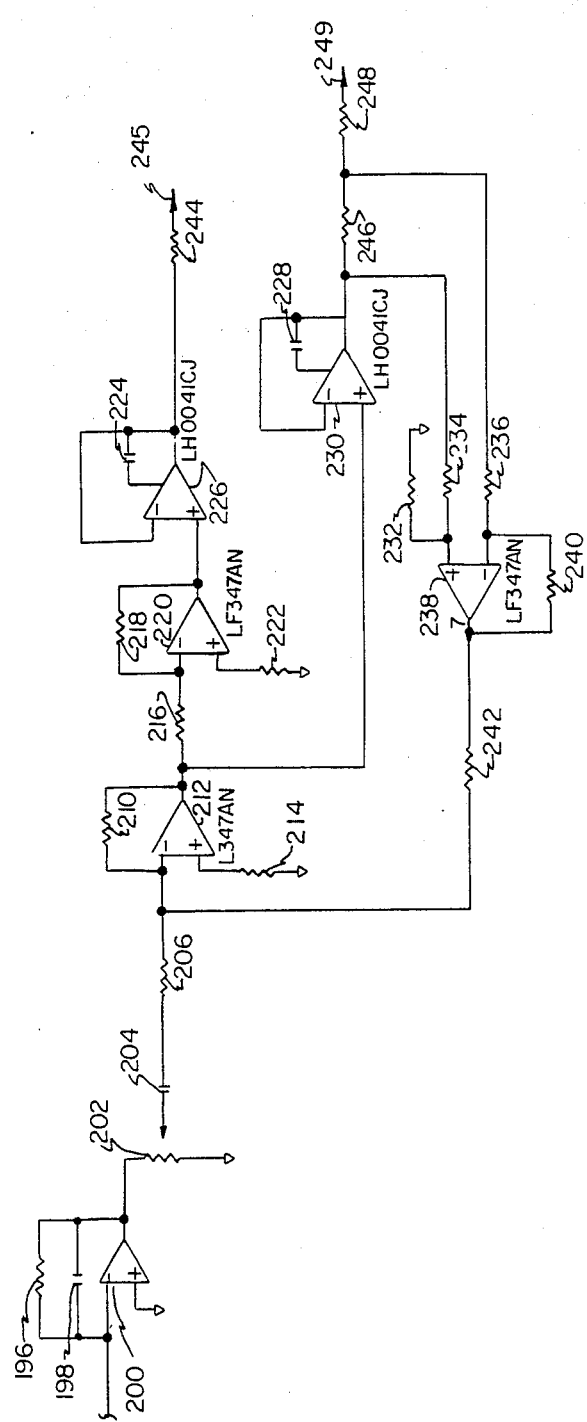

| Fig. 9a | Fig. 9b |

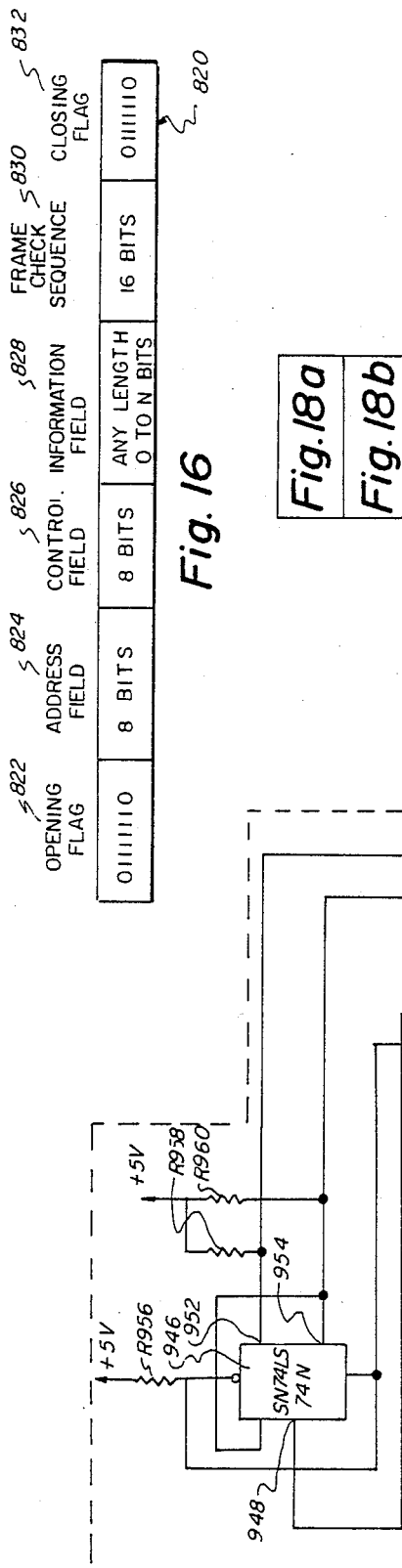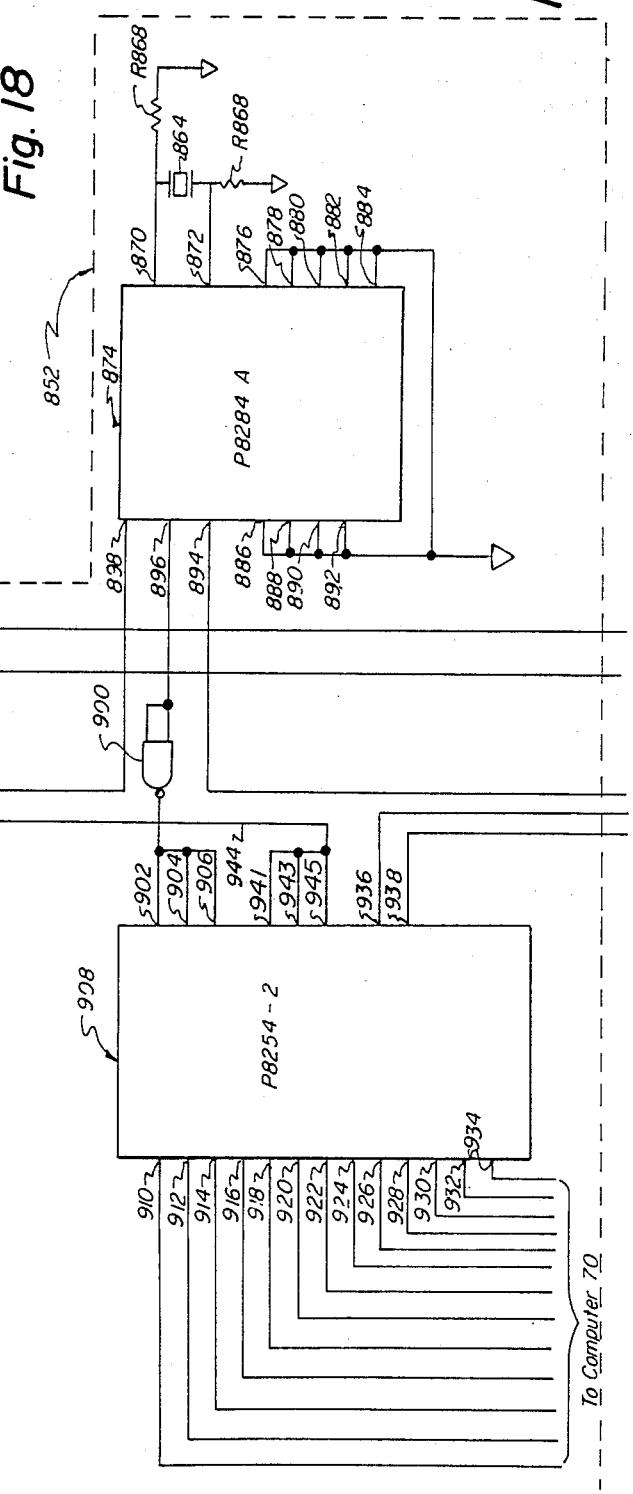

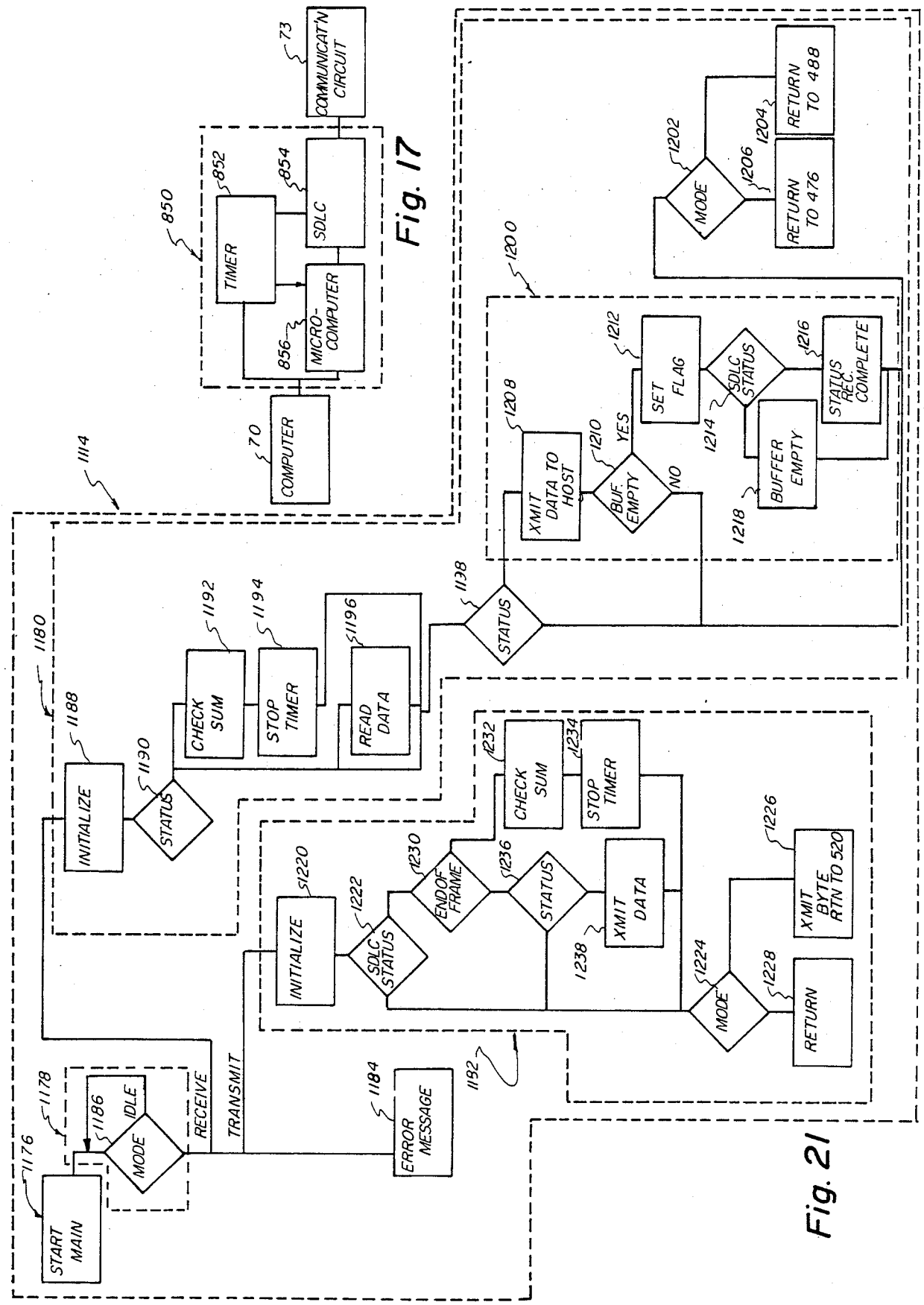

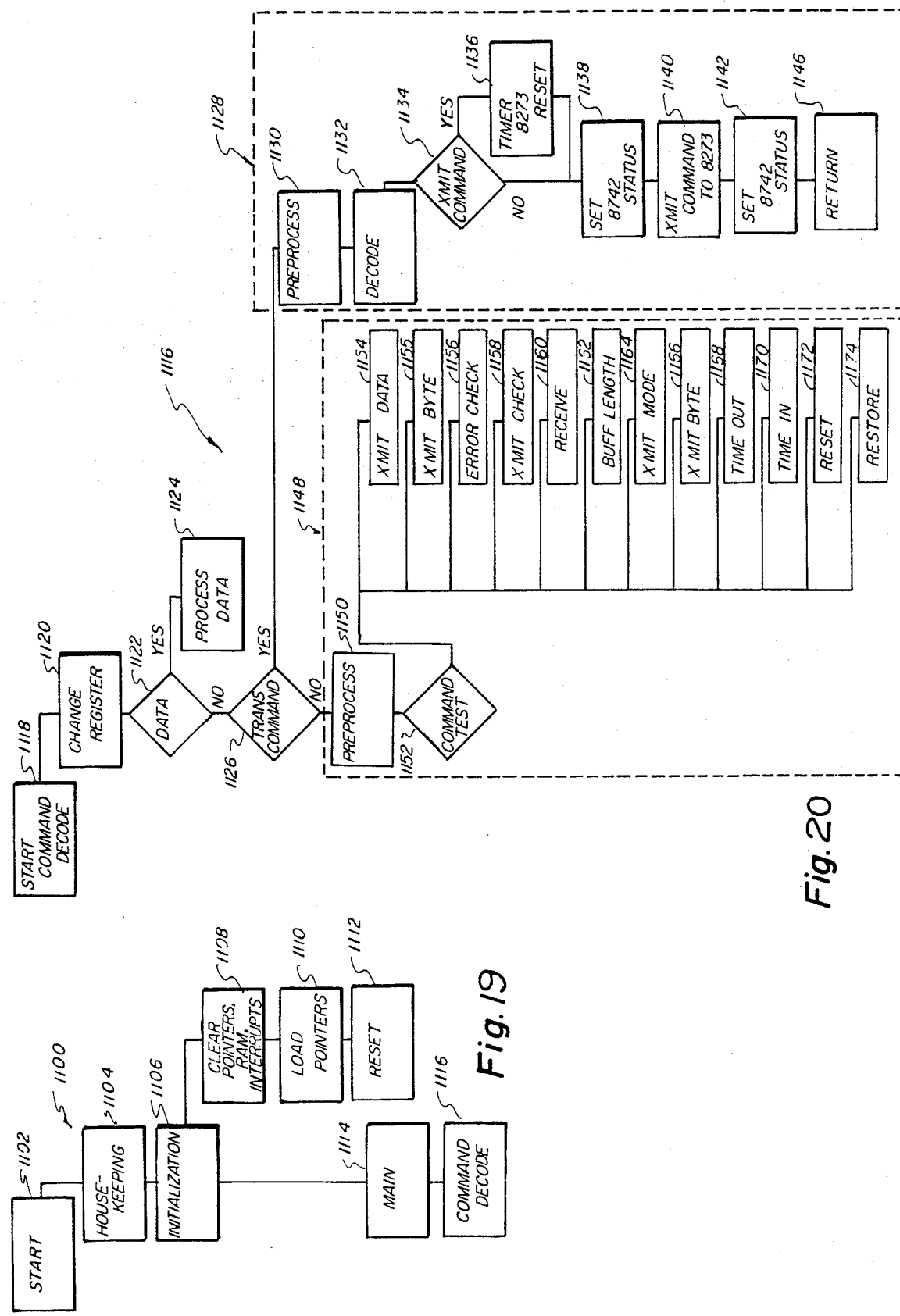

GUIDE WIRE COMMUNICATION SYSTEM AND METHOD

CONTINUITY

This application is a continuation-in-part of co-pending patent application Ser. No. 729,514, filed May 2, 1985, now abandoned.

FIELD OF THE INVENTION

This invention relates to guidance systems, and more particularly to an improvement in communication systems between a central computer and at least one mobile vehicle using low power, low frequency communication.

PRIOR ART

Arrangements in which a wire-guide traffic path has been used in the guidance of a driverless mobile unit along a desired course have been set forth in U.S. Pat. Nos. 3,009,525 and 3,147,817 issued to Robert DeLiban. In such disclosures, the traffic path is defined by a conductor energized to radiate an electromagnetic field, and a sensing means on the vehicle is operative to detect the radiated energy and to control the vehicle steering means to follow such path.

In the system disclosed in DeLiban U.S. Pat. No. 3,147,817, a main traffic path and a plurality of secondary paths which branch away from the main path at different points designated as decision points are disclosed. The portion of a path between two decision points is referred to hereafter as a block. The system further includes means whereby each vehicle senses the presence of another vehicle preceding it by less than a preassigned minimum distance, and is halted while such other vehicle remains within the minimum distance. In this arrangement, each vehicle signals its presence as it passes through a block by radiating a presence signal which is transmitted over conductors to a hold beacon associated with that block. The presence of a vehicle within the limits of a block produces a hold signal at its associated block beacon. As a further vehicle enters a block and draws abreast of the hold beacon, receipt of the hold signal from the beacon is effective to disable the propulsion means of the second vehicle, and thus stop the vehicle until the first vehicle leaves the block. The vehicles, therefore, are transmitting information onto the guide wire at times determined by the vehicle. Each vehicle appropriates the use of one or more blocks as it approaches a block.

In U.S. Pat. No. 3,544,788 to Nicolas J. Guzik, there is disclosed an electronic position indicator system, wherein position information signals are transmitted between trains traveling along the same track. Whenever a minimum safe distance between the two trains is reached, as indicated by the communication between the two trains, braking is applied to at least the following train.

While this second system is effective in maintaining the predetermined minimum spacing between train units traveling along the same track, the system relies on communication between the two train units themselves, and on the relative spacing between the train units.

Another vehicle control system which employs two-way communication is disclosed in U.S. Pat. No. 3,734,229, issued to D. T. Comer. In this system, the traffic path is defined as an array of conductors disposed along the traffic path and energized with a signal for developing magnetic fields which are detectable by a vehicle-carried guidance control unit. A separate array of twin lead conductors disposed beneath the surface of the travel paths form a distributed antenna network providing a communication medium for two-way communication between the stationary control unit and vehicle-carried control units using radio frequency waves. A separate antenna system was provided because a low frequency carrier wave was incapable of providing a sufficiently high rate of data transmission. The problem of achieving a high rate of data transmission with a low frequency carrier wave had not been solved. The system disclosed serial polling of the status of the vehicles by the stationary control unit.

In the system disclosed in U.S. Pat. No. 4,284,106, to Robert DeLiban, as each vehicle travels along a traffic layout towards a station, a transmitter on the vehicle is enabled periodically to transmit a position signal indicative of the location of the vehicle, and a receiver on the vehicle receives position signals transmitted from all of the other vehicles on the system. Whenever a vehicle comes within a minimum safe distance of a second vehicle, the first vehicle is halted. The position signals of all the vehicles are transmitted periodically in a time divided fashion. Each transmission cycle is subdivided into a plurality of time slots, and each location has a different assigned time slot. Each vehicle transmits a vehicle position signal during the time slot corresponding to the past address of the vehicle, and responds to a position signal transmitted by another vehicle in the time slot corresponding to the present address for the vehicle to halt the vehicle.

It is also known in the prior art to control a vehicle following a path defined by a current-carrying guide wire by a two way radio guidance control system in which a traction vehicle sends out location and destination intelligence to a way side station or central controller which in turn transmits steering and traction intelligence to control the vehicle.

In U.S. Pat. No. 4,215,759 to Ricardo A. Diaz, the path to be followed by the vehicle is not a single guide wire, but comprises segmented, closed loop antennae. The vehicle is commanded to be displaced successively from antenna to antenna. A central processor sends steering and traction commands to only one antenna at a time for any particular vehicle. The two way communication disclosed between vehicles and central controller is by way of relatively high frequency waves, for example, frequencies between 156,000 and 160,000 Hz, and the use of only standard transmitters, receivers and data decoders is disclosed.

BRIEF SUMMARY AND OBJECTS OF THE INVENTION

In brief summary, the present invention comprises a communication system for controlling a plurality of unmanned, task-performing vehicles as the same are caused to traverse variously along a network of guide wires, which system provides the following advantages: a logic and communication capability which provides for infinite expansion as to the number of guide wire loops and vehicles which comprise the system; accommodates polling of vehicles of the system not at predetermined times but only upon the occurrence of certain events; causes high data transmission rates to occur over low frequency carriers; achieves low power transmission by varying the electrical characteristics of the guide wire system from time to time dependent upon the function to be performed by the guide wires; provides a high gain, low frequency antenna for unmanned task-performing guide wire vehicles and allocates the resources of the system in such a way that, upon the issuance of a command, resources are exclusively available to only one vehicle to the exclusion of the other vehicles without further communication and temporarily accumulates messages of variable length in a dedicated microcomputer memory whereby efficiency of message transmissions is substantially increased.

With the foregoing in mind, it is a primary object of the present invention to provide a novel communication system for controlling a plurality of unmanned, task-performing vehicles along a network of guide wires.

A further object is the provision of such a system wherein the number of guide wire loops and vehicles may be infinitely expanded.

A further important object of the present invention is the provision of such a system wherein vehicles of the systems are polled, not a predetermined times, but only upon the occurrences of certain events.

A further dominant object of the present invention is the provision of a system of the type mentioned above wherein the data is transmitted at an extraordinarily high rate over low frequency carriers.

A further important object of the present invention is the provision of the system of the type in question wherein the data transmitted is shaped by digital model so as to comprise cosine wave segments.

A further important object of the present invention is the provision of a communication system of the type in question wherein the resources of the system are exclusively caused to be made available to a single vehicle of the system to the exclusion of other vehicles, at a common point in time.

A further significant object is the provision, in a system of the type in question, for low power transmission by varying the electrical characteristics of the guide wire system, from time to time dependent upon the function to be performed by the guide wires.

Another object of importance is the provision, in a system of the type in question, of a novel high gain, low frequency antenna for an unmanned, task-performing guide wire vehicle;

A further important object of the present invention is the provision of the system of the type in question wherein the data transmitted is temporarily stored in a dedicated microcomputer memory to increase efficiency in message transmission.

These and other objects and features of the present invention will be apparent from the detailed description taken with reference to the accompanying drawings.

BRIEF DESCRIPTION OF THE DRAWINGS

FIG. 7 shows the relationship between FIGS. 7a and 7b;

FIG. 7a is a portion of the circuit diagram of the transmitter, the detail block diagram of which is illustrated in FIG. 4;

FIG. 7b is the second portion of the transmitter circuit, the detail block diagram of which is illustrated in FIG. 4;

FIG. 16 is a block diagram of a communication message composed in accordance with the present invention;

FIG. 17 is a block diagram of the computer, the dedicated microcomputer memory circuit and the communication circuit forming a part of the system of FIG. 1;

FIG. 18 shows the relationship between FIGS. 18a and 18b;

FIG. 18a is a portion of the circuit diagram of the dedicated microcomputer memory circuit, the block diagram of which is illustrated in FIG. 17;

FIG. 19 is a flow chart for a program for controlling the dedicated microcomputer memory circuit;

FIG. 20 is a detailed flow chart of the command decoding function of the program illustrated in FIG. 19; and FIG. 21 is a detailed flow chart of the main subroutine of the program illustrated in FIG. 19.

DETAILED DESCRIPTION OF THE ILLUSTRATED EMBODIMENT

A purpose of the invention is to transmit digital data by means of a low frequency, low power wave which would not create transmission dead spots along the guide wire while maintaining a relatively high rate of data transmission between at least one central host computer and at least one remote mobile unmanned vehicle.

Messages may be of arbitrary length. Transmission of messages occurs on an as-needed basis. Restated, messages are transmitted between the host computer and unmanned vehicles in an order and at a frequency dependent on circumstances. Message collisions are avoided and transmission rates are optimized by a novel guide wire communication system and method.

In connection with the mentioned guide wire communication system, a novel dedicated microcomputer memory with associated software provides optimization of message handling. The dedicated microcomputer memory disclosed below is usually an integral part of either a host computer or a computer on a remote vehicle or both.

To transmit digital data by a low frequency, low power wave, at least two distinct frequencies are chosen to represent different digital states. These frequencies may be multiples of each other, but do not need to be. The frequencies may be chosen to avoid the requirements of an FCC license. By way of example, in the preferred embodiment, a data transmission rate of 9600 BAUD was selected. Still by way of example, one cycle at 9600 Hz was selected to represent a digital state of "0", and two cycles at 19200 Hz were selected to represent a digital state of "1". Clearly, other transmission rates and frequencies could be selected within the scope of the invention, or the interpretation of the logical states represented by the frequencies could be reversed without any fundamental change in the invention.

Figure 1:
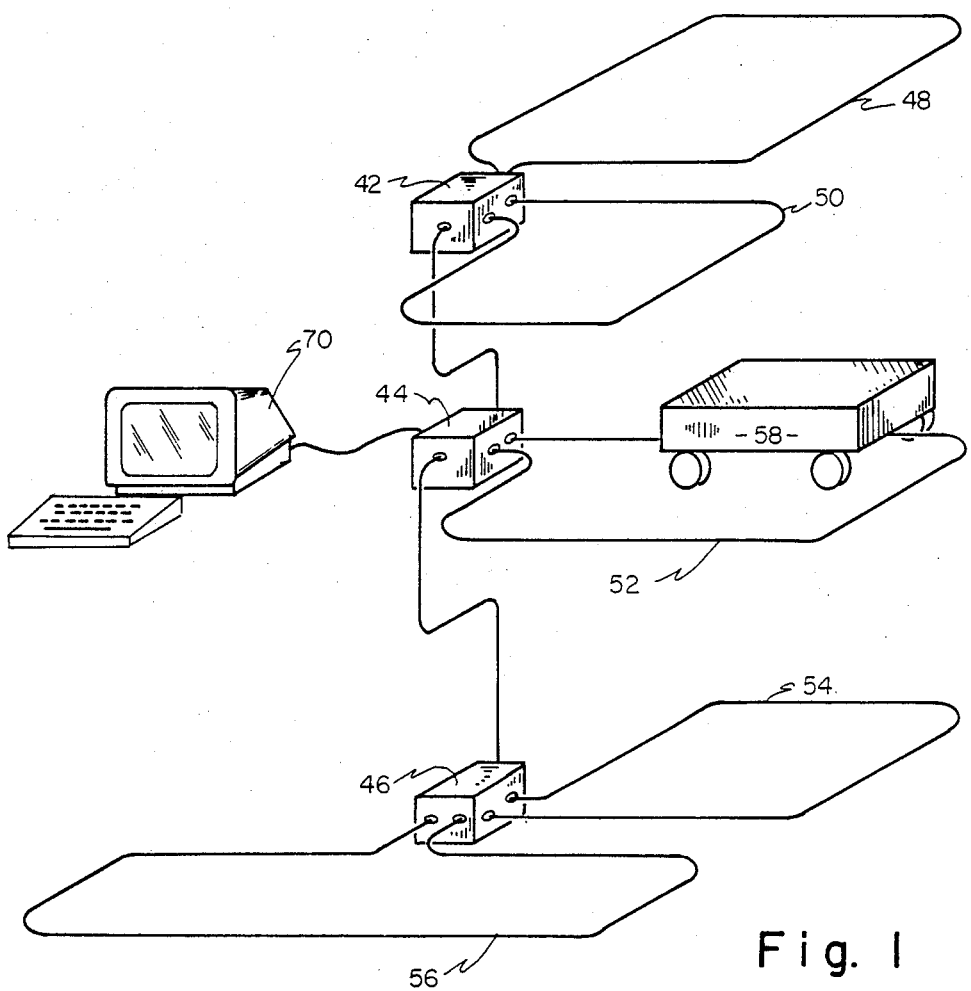
FIG. 1 is a perspective, presented in schematic form, of a presently preferred communication network showing a computer and a plurality of enclosures connected to guide wires for selectively controlling unmanned vehicles, in accordance with the present invention.

Referring to FIG. 1, the preferred method for recognizing the distinct frequencies mentioned above comprises identifying positive-negative voltage transitions to determine the period of the wave. A waveform is transmitted to a vehicle 58 from a communication circuit 71 (see FIG. 2) which is usually associated with a plurality of other communication circuits in an enclosure, such as enclosure 44, by means of a guide wire, such as guide wire 52, which serves an an antenna. A waveform from the vehicle 58 is picked up by the guide wire 52 and received by the communication circuit 71 in an enclosure 44.

Figure 2:
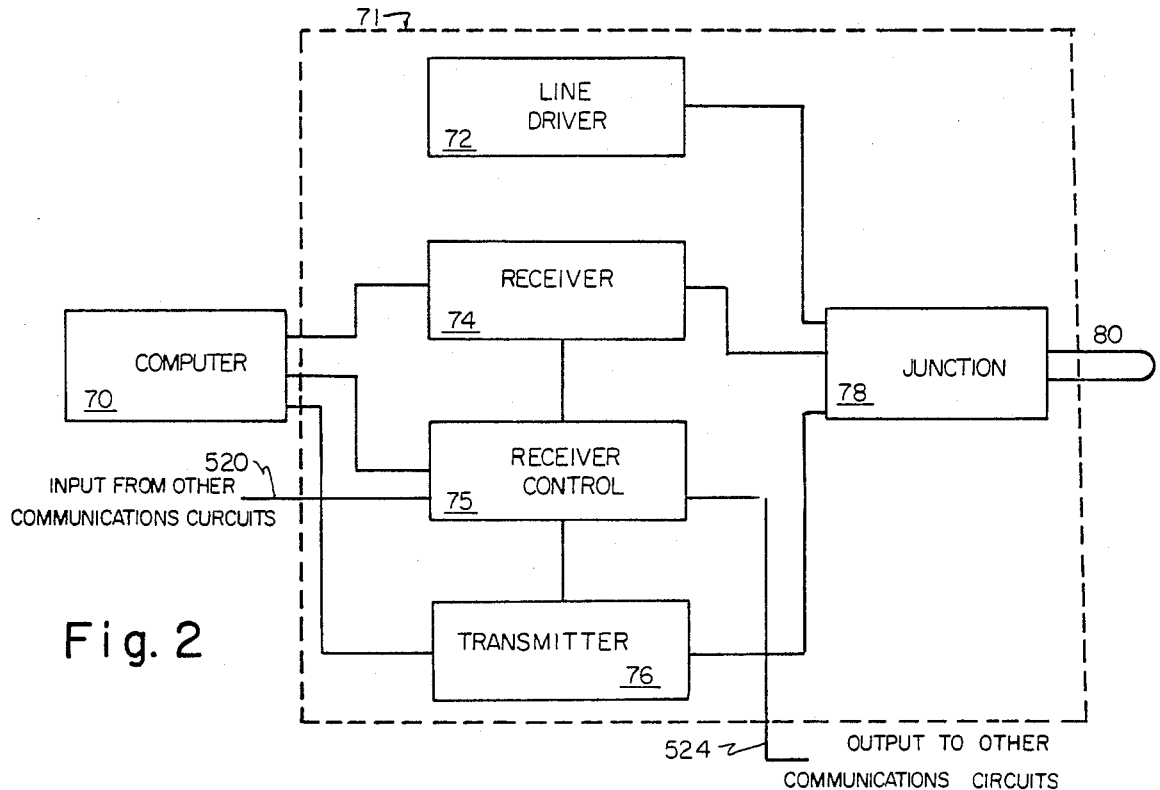
FIG. 2 is a block diagram of the computer and one communication circuit forming a part of the system of FIG. 1.

Whenever the guide wire is of significant length it has an impedance associated with it which effects transmissions. The filtering effect of impedance causes the transitions between the frequencies mentioned above to be altered to another frequency, which is between the selected frequencies. The presence of a spurious frequency would cause errors in the recovery of transmitted data. Therefore the invention teaches that the data should be transmitted as cosine wave forms of substantially identical amplitude. Because the slopes of any two sinusoidial waves (either sine or cosine) at the maxima or mimina are essentially equal (that is, essentially equal to zero), a transition between two wave segments of different frequencies but essentially equivalent amplitudes can be made at a maximum or minimum amplitude without significantly altering the frequency of either segment by inductance. Referring now to FIG. 2, as more fully described below, the transmitter section 76 produces cosine wave segments, representing digital information. When the wave forms are recovered by the receiver section 74, the cosine segments are converted to sine segments to provide a positive-negative voltage transition at the beginning and end of each cycle. Inductive effects in the receiver section 74 are controlled within tolerable limits because of the relatively short distances between components in the receiver section 74.

A communication circuit 71 is shown in block diagram form in FIG. 2. The circuits comprise a vehicle traffic control computer section 70, a transmitter section 76, a receiver section 74, a receiver control section 75 and a line driver section 72. The transmitter section 76, the receiver section 74 and the line driver section 72 are connected through a junction 78 to guide wire 80. The transmitter 76 accepts digital data from the vehicle traffic control computer 70 and transforms the data into a relatively low frequency, low power wave of at least 2 frequencies whose components are cosine periods. The receiver accepts data in a form similar to the form produced by the transmitter. It then shifts the data from a cosine wave to a sine wave by means of a differential amplifier. The resulting wave forms are processed to recover the digital data imposed thereon. The junction 78 presents favorable electrical characteristics to the wave forms transmitted by the transmitter section 76 or the line driver section 72 or received by the receiver section 74 as more fully set forth below.

Figure 5:
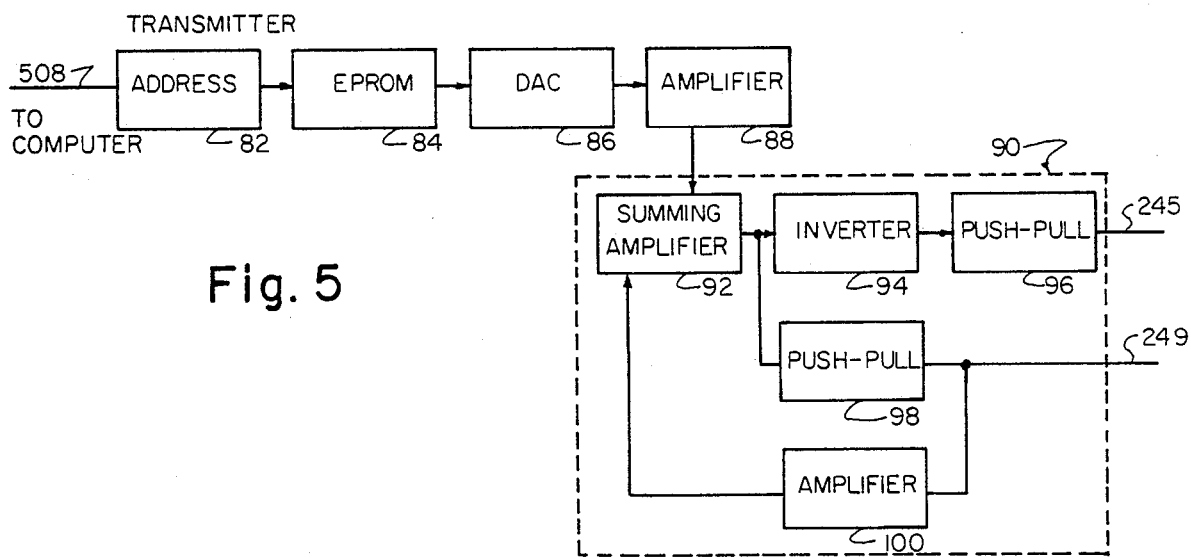
FIG. 5 is a detailed block diagram of the transmitter of FIG. 2.

The transmitter section 76 has a connection to the vehicle traffic control computer 70, which provides the transmitter section 76 with input data and a clock signal at a suitable multiple of the highest data frequency employed, for example, 64 times the fundamental period of the highest data frequency. Referring now to FIG. 5 based on the input from the vehicle traffic control computer 70, the address circuit 82 addresses a location in the Erasable Programable Read Only Memory 84 (EPROM). At unique address locations in the EPROM 84 a plurality of series of values representing discrete steps on a wave form are stored. In the preferred embodiment, the wave forms are cosine wave forms, but any desired wave form could be stored without altering the invention. In response to a signal from the address circuit 82, the EPROM 84 will output a selected series of values, with each value transmitted at relatively equal intervals as synchronized by the clock signal. The output of the EPROM 84 is input to a digital-to-analog converter 86 (DAC) which produces a cosine wave form in response to the values provided by the EPROM 84. The wave form produced by the DAC 86 is passed through at least one stage of amplification by an amplifier 88. The amplified wave form is passed to a push-pull amplifier with current feed back 90. This stage comprises a summing amplifier 92 which is part of the feed back operation, and two push-pull circuits 96 and 98, one of which is provided with a voltage inverter 94, thus providing that the operation of the push-pull circuits 96 and 98 will be 180° out of phase. The output of one side of the push-pull amplifier is sampled and amplified by a amplifier 100 and the amplified sample is fed back to the summing amplifier 92. The feed back described insures that the output of the push-pull amplifier retains the cosine wave form produced by the DAC 86. The wave form is then fed to the junction 78.

Figure 4:
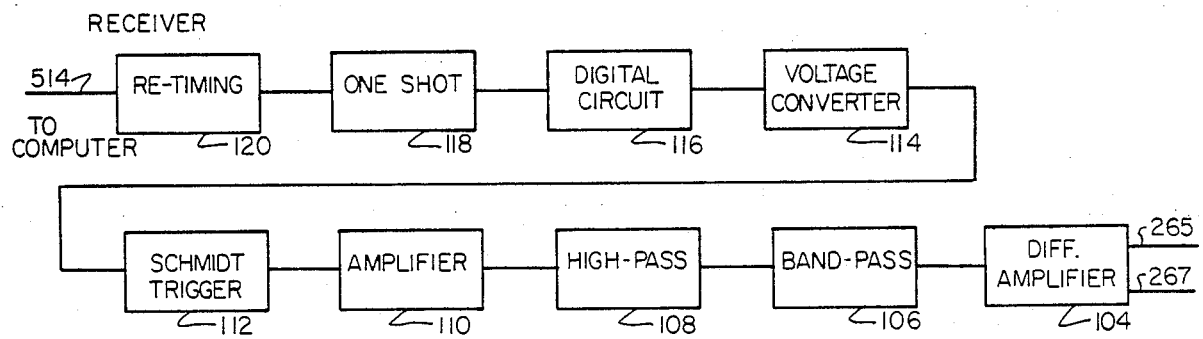
FIG. 4 is a detailed block diagram of the receiver of FIG. 2.

The receiver section 74 is also provided with a connection to the vehicle traffic control computer 70. The vehicle traffic control computer 70 provides the clock signal mentioned above and receives the output of the receiver section 74. The receiver section 74 is more fully set forth in FIG. 4.

The receiver section 74 accepts an output from the junction 78 in the form of a complex wave. Data from a vehicle 58 is carried on the wave in the form of cosine-shaped wave segments of various frequencies as explained more fully below. The complex wave is input to a differential amplifier 104 which produces a sinusoidal wave corresponding in frequency to the cosine input. The sinusoidal wave is filtered through a band pass filter 106 and a high pass filter 108 to remove spurious wave forms and noise and to remove components attributable to the line driver section 72. The filtered sinusoidal wave is input to a Schmidt switching amplifier 112. By means of the Schmidt switching amplifier 112 the filtered sinusoidal wave is transformed into a square wave which corresponds to the data transmitted by a vehicle 58. The voltage converter 114 converts the amplitude of the square wave to TTL voltage levels for input to a digital circuit 116. The digital circuit 116 outputs a voltage pulse at each voltage transition of the square wave. The resulting series of pulses is sent to a retriggerable one-shot 118 which is set to time out if the series of pulses represents one frequency and not to time out if the series represents the other frequency. For example, in the exemplary embodiment, the retriggerable one shot 118 is set to time out on the pulses caused by the 9600 Hz transitions (about 2 pulses in a 50 micro second period) and not to time out on the pulses caused by the 19200 Hz transitions (about 3 pulses in a 50 microsecond period). The output of the retriggerable one shot 118 is processed by a re-timing circit 120. The retiming circuit produces a signal of TTL voltage level and of selected time-interval length. This process eliminates any imprecision in the timing of the data bits which may have been accumulated in the processes of encoding, transmission, reception and decoding. In the exemplary embodiment, the re-timing circuit 120 is set to output a "0" for 104 microseconds duration with two transition time outs by the retriggerable one shot 118. This represents one complete cycle at 9600 Hz. The re-timing circuit 120 outputs a "1" when there are no transition time outs in a given interval, representing 2 complete cycles at 19200 Hz. The duration of the "0" and "1" digital state signals is controlled by the re-timing circuit 120, and not by the actual frequency of the received wave, which may not be identically equal to the frequency of the transmitted wave because of accumulated errors. The output of the re-timing circuit 120 represents the recovered digital data which can then be processed by a vehicle traffic control computer 70.

Figure 3:
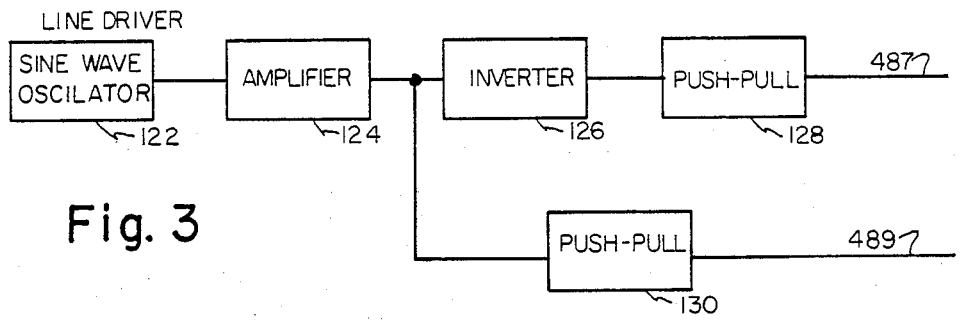
FIG. 3 is a detailed block diagram of the line driver of FIG. 2.

A third component of the communication circuit is a line driver section 72. The components of the line driver section 72 are shown in block diagram form in FIG. 3. Selected guidance frequencies are generated by a plurality of sine wave oscillators 122. In the exemplary embodiment, a frequency of 964 Hz and a frequency of 1155 Hz were selected. The guidance frequencies are chosen to be distinguishable from each other and from the communication frequencies, to optimize transmission, and to minimize both power requirements and the creation of dead spots over the guide wire 80 and may be chosen to avoid FCC regulatory restrictions. Nevertheless, the frequencies may be varied without altering the invention. The output of the sine wave oscillator 122 is amplified by at least one stage of amplification at amplifier 124. The amplified wave is then input to push-pull amplifier which is provided with two push-pull circuits 128 and 130, one of which is provided with a voltage inverter 126. The voltage inverter 126 assures that the out put of the push-pull circuits 128 and 130 will be 180° out of phase. The guidance wave is then fed to a junction 78.

Figure 6:
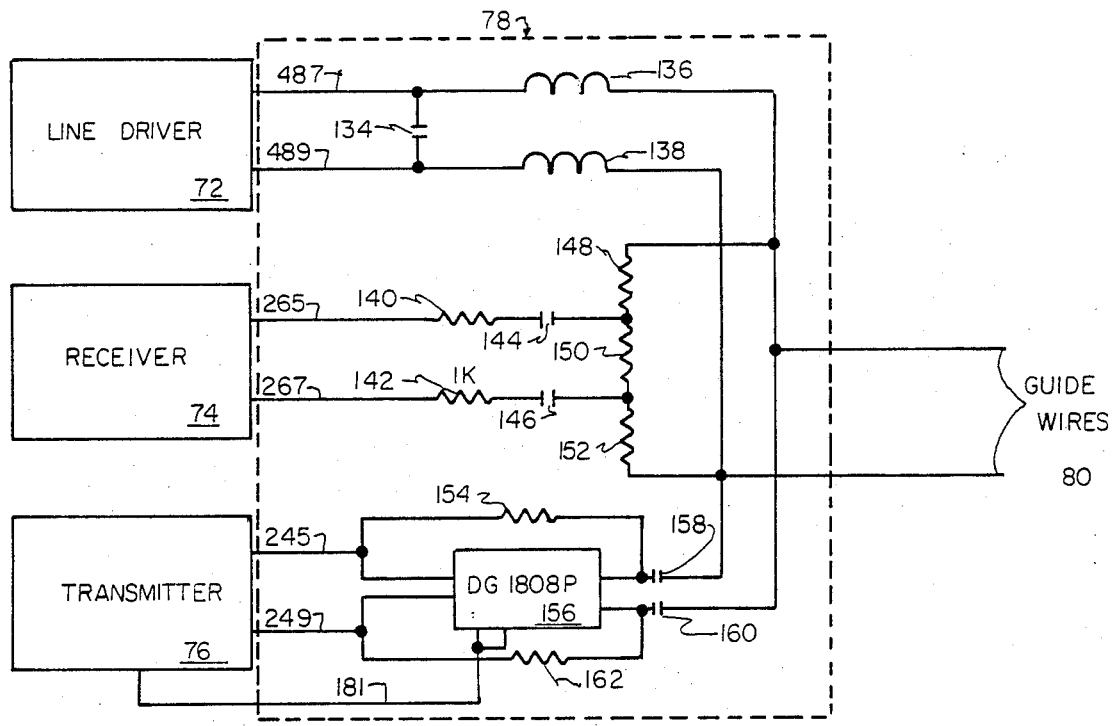
FIG. 6 is a circuit diagram of the junction of FIG. 2.

The transmitter section 76, the receiver section 74 and the line driver section 72 are connected to a guide wire 80 through a junction 78. The transmitter section 76 is connected to the junction 78 through lines 245 and 249. The receiver section 74 is connected to the junction 78 through lines 265 and 267. The line driver section 72 is connected to the junction through lines 487 and 489. The junction 78 provides different electrical characteristics for the transmitter section 76, the receiver section 74 and the line driver section 72. The junction 78 is shown in circuit form in FIG. 6. The line driver section 72 is coupled to the guide wire 80 across a pair of inductors 136 and 138 and a capacitor 134 which cause the guide wire to have a relatively low impedance as viewed from the line driver section 72. In the exemplary embodiment, inductors 136 and 138 have values of 500 uH each and capacitor 134 has a value of 1.5 uf, for example. The receiver section 74 utilizes the guide wire 80 as an antenna to receive a signal transmitted by a plurality of vehicles 58. The guide wire 80 must be given a high impedance when viewed from the receiver section 74, so that a low power transmission from the vehicles 58 can be received. In the exemplary embodiment, this result is accomplished by three resistors 148, 150 and 152 in series with two capacitors 144 and 146 and two additional resisters 140 and 142 in parallel, as shown in FIG. 6. Values of the components may be altered without changing the invention. By way of example, in the exemplary embodiment, resistors 148 and 152 have values of 100 ohms, resistor 150 has a value of 47 ohms, resistors 140 and 142 have values of 1,000 ohms and capacitors 144 and 146 have values of 0.1 uf. The transmitter section 76 needs variable characteristics depending on whether it is transmitting data or not. In line with the transmitter section 76, the junction 78 has an analog FET switch 156, for example a DG 180BP available from Siliconix that disconnects the transmitter section 76 from the guide wire 80 when a transmission is not in progress. The analog FET switch 152 is connected to a one shot 550 that is triggered by a 64X clock 510 in the vehicle traffic control computer 70 by line 510. When the 64X clock signal is present on line 510, the vehicle traffic control computer 70 is transmitting and the analog FET switch 156 is closed. Otherwise, the analog FET switch 156 is open.

Having described the characteristics of the transmitter section 76, receiver section 74 and the line driver section 72 above, a more detailed description of a particular embodiment is set forth below. A detailed description of the receiver control circuit 75 is deferred until the relationship between communication circuits has been described. In accordance with prior art, particular values of components may be altered or different integrated circuit chips may be employed without altering the invention. Moreover, in accordance with prior art, various means for monitoring the performance of the circuits described herein could be provided. Since such means are well known in prior art, they are not described herein.

Reference is now made to FIG. 7. In the transmitter section 76, the address circuit 82 is provided with a retriggerable one shot 170, which may be a SN74123N available from Texas Instruments, for example, which is used to reset and enable various integrated circuits when data is being transmitted. At pin 1, the retriggerable one shot 170 is connected to ground. Pin 2 is provided with a signal through line 510 from the 64X clock. Pins 14 and 15 are connected to a power supply through an appropriate capacitor 171 and resistor 173. Pin 4 provides output to clear a shift register 172 and two divide-by-sixteen counters, 174 and 176, described below whenever the signal from the 64X clock is interrupted. Pin 3 of the retriggerable one shot 170 is connected to a receiver control circuit 75 through lines 561. The operation of the receiver control circuit 75 is described in detail elsewhere. Line 3 is connected to a pull-up register 177. When the retriggerable one shot 170 is in the cleared state, it produces a signal at pin 13 used to activate the FET switch 156 in the junction via line 181, thereby refeflectively disconnecting the transmitter 76 from the guide wire 80.

The shift register 172, which may be an appropriate integrated circuit such as an SN74LS96N available from Texas Instruments, is connected to the vehicle traffic control computer 70 through line 508. The clear is disabled with a voltage source through a resistor 175. Said shift register 172 is capable of storing the last bit transmitted, the current bit and the next bit. The status of all three bits can be used to select an address in the EPROM 180 containing a representation of a wave form in the form of a series of numbers of representing the current bit which could compensate for inductance effects caused by the leading and trailing bits. The number of stored wave forms is dependant on the number of distinct combinations of bits. This refined wave may be employed in certain embodiments of the invention, but in the preferred embodiment, a wave form based solely on the character of the current bit has been found to be sufficiently accurate.

The divide-by-16 counters 174 and 176 are clocked by the 64X clock to enable the counters 174 and 176 to serially address 64 memory locations in the EPROM 180 which contain discrete values representing points on a particular cosine wave form. In response to the input provided by the shift register 172 and the divide-by-16 counters 174 and 176, an EPROM 180, such as AM2716-DC available from Advanced Micro Devices, produces a series of discrete values at time intervals equal to 1/64 of the period of the lowest communication frequency. The series of values in input to a digital-to-analog converter 188 (DAC) such as a DAC0808LCN available from National Semiconductor. The DAC 188 is provided with appropriate biasing, according to the prior art as represented by resistor 190, resistor 182 and capacitor 194. The DAC 188 produces a cosine wave form based on the series of discrete values provided by the EPROM 180. The cosine wave form is amplified by an operational amplifier 200, such as LF347AN available from National Semiconductor. The operational amplifier 200 is biased with appropriate capacitor 198 and resistor 196. A variable resistor 202 is used to control the input to the push-pull amplifier 90. A summing amplifier 272, such as a LF347AN is used to insure that the output of the push-pull amplifier 90 retains its characteristics of the input wave as a cosine wave segment. The summing amplifier is provided with feed back from the output of one push-pull circuit such as push-pull circuit 230 through a current amplifier 238, such as LF347AN. Appropriate biasing resistors are provided in accordance with prior art. An inverter 220, such as LF347AN biased substantially as shown will invert the incoming wave signal, causing the function of the two push-pull amplifiers 226 and 230 to by 180° our of phase. The push-pull amplifiers may be an integrated circuit such as LH0041CJ available from National Semiconductor, connected substantially as shown. The use of the push-pull circuits 226 and 230 permits the wave form to be transmitted at lower levels.

Resister 244, 246 and 248 provide loads for the push-pull amplifiers 226 and 230 in accordance with prior art. The output of the transmitter section 76 is carried to the junction 78, which is more particularly described above, by lines 245 and 249.

Figures 8, 8A:
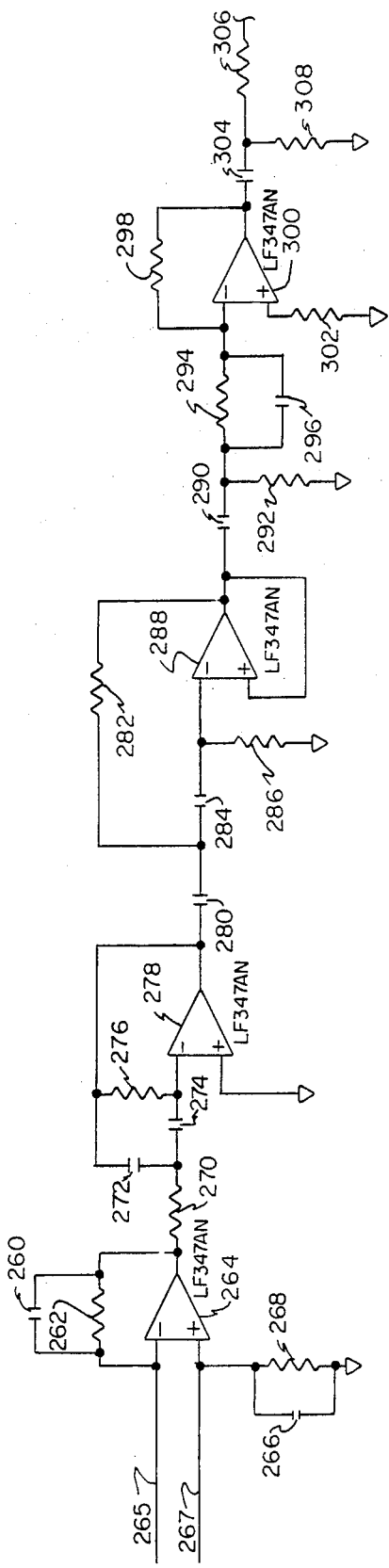
FIG. 8 illustrates the relationship between FIGS. 8a, 8b and 8c.
FIG. 8a is a portion of the circuit diagram of the receiver, the detail block diagram of which is illustrated in FIG. 4.
Figure 8B:
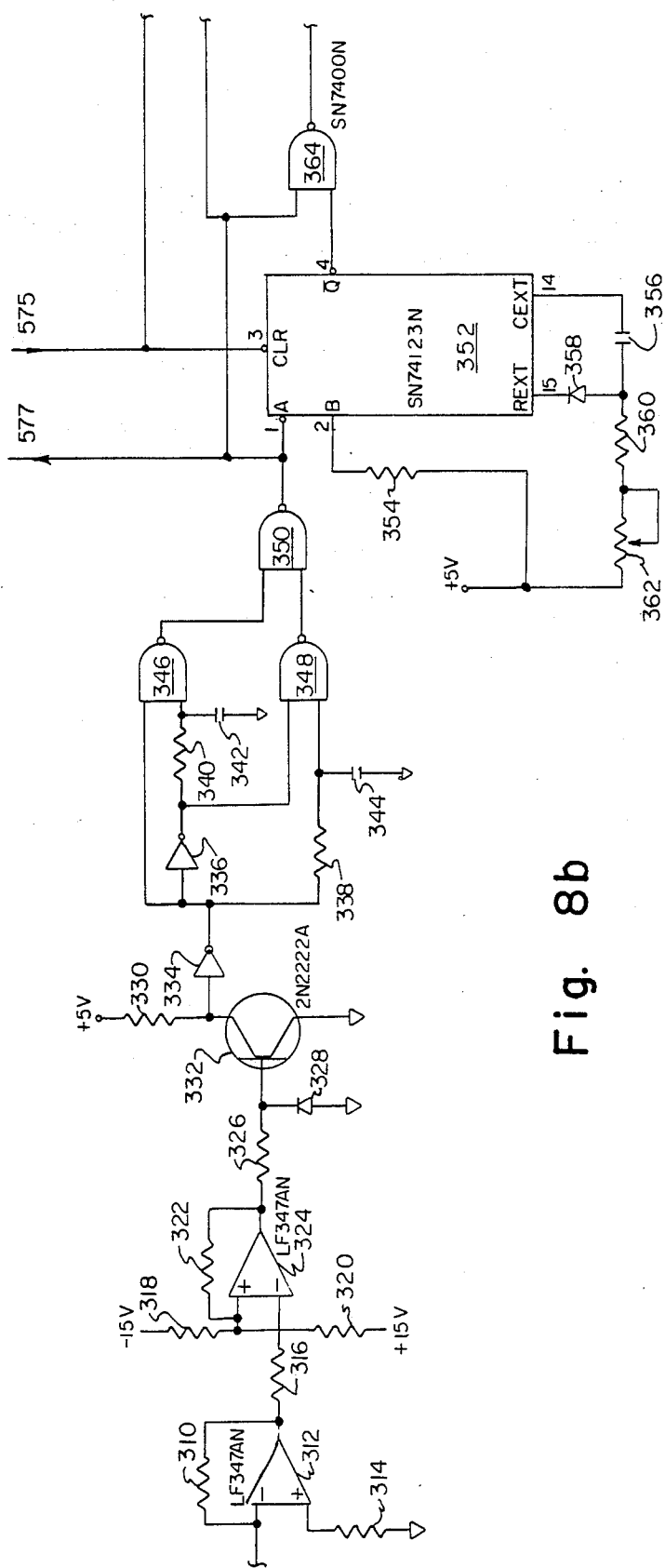
FIG. 8b is a second portion of the circuit diagram of the receiver, the detail block diagram of which is illustrated in FIG. 4.
Figure 8C:
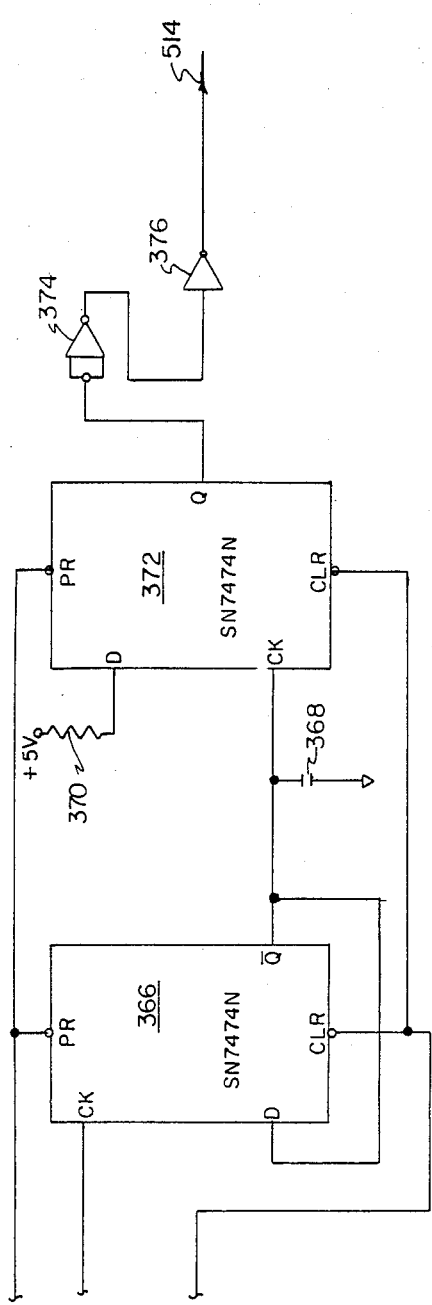
FIG. 8c is a third portion of the circuit diagram of the receiver, the detail block diagram of which is set forth in FIG. 4.

Reference is now made to FIG. 8. In the receiver section 74, the differential amplifier 104 is connected to the junction 78 via lines 265 and 267. The differential amplifier 104 is comprised of an operational amplifier 264 such as LF347AN, with biasing resistor 262 and capacitor 260 according to the prior art. The positive input of operational amplifier 264 is grounded through a capacitor 266 and resistor 268 in parallel. The band pass filter 106 comprises an operational amplifier 278 such as LF347AN with appropriated biasing capacitors 272 and 274 and resistors 270 and 276, according to prior art.

The high pass filter 108 is comprised of an operational amplifier 288 such as LF347AN and suitable resistors 282 and 286, capacitors 280 and 284 and grounding according to prior art. Capacitor 290 is a coupling capacitor located on the output side of the high pass filter.

The primary purpose of the high pass filter 108 is to pass the communication frequencies while rejecting the guide frequencies produced by the line driver 72. Resistor 282 and capacitor 284 should be chosen to eliminate frequencies substantially below the lowest selected communication frequency.

After filtering, the wave form may be passed through a plurality of amplifiers 110. In the exemplary embodiment, two amplification stages are disclosed, comprising identical operational amplifiers 300 and 312 such as LF347AN with appropriate biasing resistors and capacitors according to the prior art.

The amplified wave form is passed to a Schmidt switching amplifier 112 comprising a operational amplifier such as LF347AN biased by a resistor 322 according to the prior art. The positive input of the operational amplifier is provided with a normalized ground by creating a voltage drop between a negative voltage source and a positive voltage source of equal amplitudes. In the exemplary, embodiment, the voltage drop is occasioned by resistors 318 and 320. Resistor 326 provides a load for the operational amplifier. The output of the Schmidt switching amplifier 112 is a square wave which corresponds to the input wave. The voltage amplitude of this square wave is adjusted to TTL levels by the voltage converter 114. The voltage converter 114 comprises a transistor 332 such as a 2N2222A with the emitter grounded. The collector is biased to a voltage source through a resistor 330. The output of the voltage converter 114 is passed through a digital circuit 116 which produces a pulse corresponding to each voltage transition on the square wave. The digital circuit 116 comprises a voltage inverter 334 such as an SN7404N available from Texas Instruments connected to a NAND gate 348 such as a SN7400N available from Texas Instruments. A load resistor 338 is inserted between the inverter 334 and the NAND gate 348. The NAND gate is also provided with a ground through a capacitor 344.

The combination of resistor 338 and capacitor 344 alters the time-constant of the section of the digital circuit 116 between the inverter 334 and the NAND gate 348, which causes the square wave on that segment to be delayed slightly.

The output of the voltage inverter 334 is hard-wired through a second voltage inverter 336, for example a SN7400N. The second voltage inverter 336 is connected to a second NAND gate 346 through a second loading resistor 340 and grounding capacitor 342. The first inverter 334 is also hard-wired to the second NAND gate 346. The output of the second voltage inverter 336 is hard-wired to an input of the first NAND gate 348. The output of the first NAND gate 348 and the second NAND gate 346 connected to the input of a third NAND gate 350. The inputs of the first and second NAND gates 348 and 346 which contain a resistor capacitor combination (resistors 338 and 340 and capacitors 342 and 344) are slightly delayed with respect to the other inputs of the NAND GATES 348 and 346. The output of the first NAND gate 348 produces a positive voltage peak for a rising voltage transition while the output of the second NAND gate 346 produces a voltage spike for a falling voltage transition. These two outputs are combined through the third NAND gate 350.

The output of the digital circuit 116 is transmitted via line 577 to the receiver control section 75, whose function is explained below.

The output of the digital circuit 116 is also input to a retriggerable one shot circuit 118 which comprises a retriggerable one shot 352 such as SN74123N which is connected, in the exemplary embodiment, to time out on pulses which represent a 9600 Hz wave and not to time out on pulses which represent a 19200 Hz wave. This configuration is accomplished by use of capacitor 356 diode 358 such as a 1N914B, and variable resistor 362. End resistors 354 and 360 are provided to assure linearity of response over the range of adjustments of resistor 362. A NAND gate 362 is provided as part of the receiver control circuit described in greater detail elsewhere herein. The output of the retriggerable one shot circuit 118 is essentially two time outs in each cycle at 9600 Hz and no time outs in each cycle at 19200 Hz. This signal is converted to digital information and of appropriate voltage levels and time intervals by the retiming circuit 120. The retiming circuit 120 comprises a synchronized clock divider 366 which delays clocking of data until the second half of an actual input cycle, and an output register 372 which is synchronously set true by each second 19200 Hz pulse output from the synchonizing clock divider 366 and which is as lynchronously reset false on the trailing edge of a 9600 Hz pulse.

Retriggerable one shot 352, synchornizing clock divider 366, and output register 372 are provided with an input via a line 575 from the receiver control section 75, whose function is explained below. The output of the receiver section 74 is transmitted to the vehicle traffic control computer 70 over a communication line 514.

Figures 9, 9A:
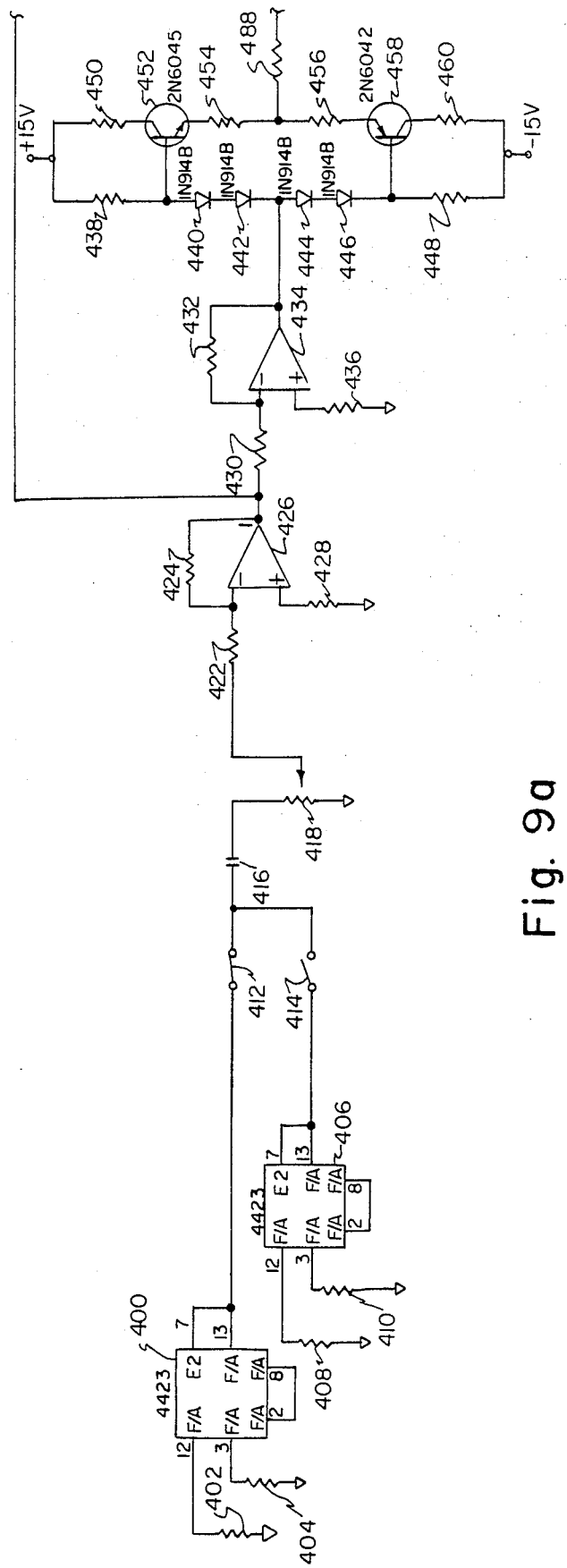
FIG. 9 illustrates the relationship between FIGS. 9a and 9b.
FIG. 9a illustrates a first part of the line driver circuit, the detailed block diagram of which is set forth in FIG. 3.
Figure 9B:
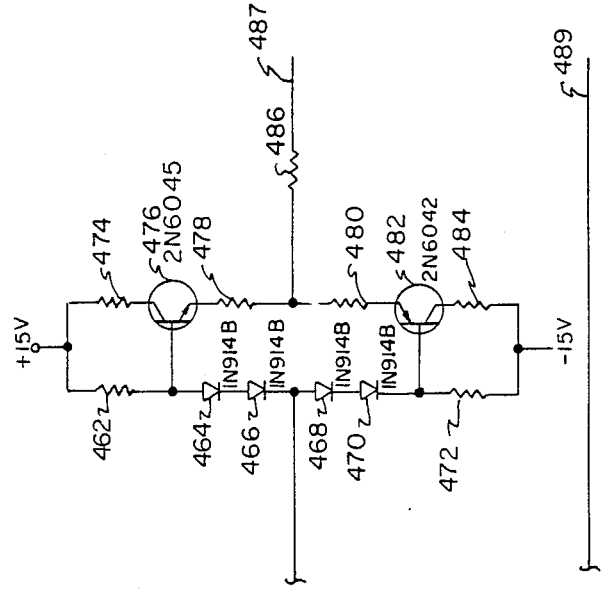
FIG. 9b illustrates the remainder of the line driver circuit, the detailed block diagram of which is set forth in FIG. 3.

Reference is now made to FIG. 9. In the line driver section 72, an initial wave form is produced by a plurality of sign wave oscillators 122. Sign wave oscillators are comprised of programable oscillators 400 and 406 such as 4423 from Buhr-Brown. In the preferred embodiment, two oscillators are used which have been provided with appropriate grounding through a plurality of resistors 402, 404, 408 and 410 to achieve output frequencies of 964 Hz and 1155 Hz. Switches 412 and 414 permit selection between the two frequencies. The amplitude of the output frequency is coupled through capacitor 416 and variable resistor 418. Variable resistor 418 is used to tune the line driver section 72 to the particular guide wire 80 to which it is attached. At least one stage of amplification is provided by an amplifier 124. In the preferred embodiment, amplifier 124 is comprised of an operational amplifier 426 such as LF347AN provided with appropriate biasing and load resistors 422, 424 and 428 according to the prior art, substantially as shown. The amplified guide wave is passed from the amplifier 124 to a push-pull amplifier 132 comprising two push-pull circuits 128 and 130, and an inverter 126. The inverter 126 comprises an operational amplifier such as LF347AN with appropriate biasing resistors 430, 432 and 436 according to the prior art. The push-pull circuits 128 and 130 may be provided by commercially available integrated circuits. In the preferred embodiment, however, full scale components were employed to adequately handle the aplied loads without distortion. In the preferred embodiment, both push-pull circuits 128 and 130 are identical and, therefore, only one is hereinafter described.

Push-pull circuit 128 is comprised of a series of diodes 440, 442, 444 and 446 with the input wave form appearing at the center of the series of diodes. In the exemplary embodiment, a suitable commercially available diode is IN914B available from National Semiconductor. The two ends of the diode series are connected through substantially similar transistor circuits, which are provided with appropriate biasing resistors according to the prior art. The base of transistor 452 is connected to one end of transistor 458 are similarly connected through resistors 448 and 460. The voltage source provided for transistors 458, however, is a negative voltage source. The emitters on transistors 452 and 458 have an opposite sense. An appropriate commercially available embodiment of transistor 452 is an 2N6045 available from National Semiconductor. An appropriate commercial embodiment for transistor 458 is a 2N6042, available from National Semiconductor. The emitters of the transistors 452 and and 458 are connected through resistors 454 and 456. The output of the push-pull circuit 128 is connected between resistors 454 and 456.

The second push-pull circuit 130 is shown, in the exemplary embodiment to be substantially identical to the push-pull circuit 128 and comprises diodes 464, 466, 468, 470; transistors 476 and 482; and resistors 462, 472, 474, 478, 480 and 484, which have equivalent values and commercially available components comparable to those disclosed with regard to push-pull circuit 128. Each push-pull circuit 128 and 130 is provided with a load resistor 488 and 486, respectively, which each have a preferred value of 4.99 ohms.

The output of the push-pull amplifier 132 is connected to the junction 78 via lines 487 and 489. The operation of the junction has been described above.

Figure 10:
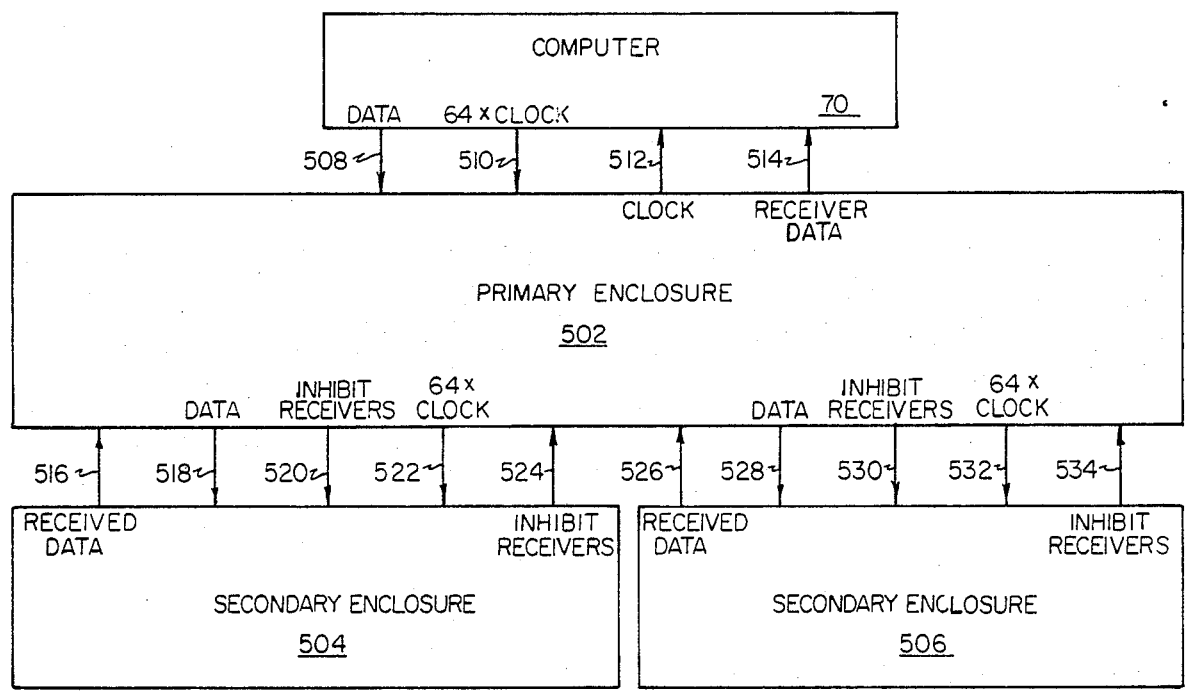
FIG. 10 is a block diagram illustrating the relationship between the computer, the primary enclosure and two secondary enclosures.

A guide wire vehicle communication system employing the communication circuits described comprises at least one vehicle traffic control computer 70 connected to a plurality of communication circuits 71 each of which is connected to a single guide wire 80. In addition to controlling one guide wire 80, each communication circuit 71 can be connected to a plurality of communication circuits which are controlled through the first communication circuit 71. Thus, the communication circuits can form a tree with the vehicle traffic control computer 70 as the root. In the exemplary embodiment, provision has been made for each communication circuit 71 to be connected to as many as two subsets of communication circuits, but additional subsets could be provided in accordance with the invention. A subset of communication circuits comprises a plurality of communication circuits. Referring to FIG. 10, a plurality of communication circuits 71 may be physically grouped together in at least one enclosure such as primary enclosure 502. In the preferred embodiment provision has been made for up to five different communication circuits 71 in any enclosure. The different communication circuits 71 are distinguished electrically by setting dip switches which are provided in the preferred embodiment. In order to keep transmission and reception from both the vehicle traffic control computer 70 and each of a plurality of vehicles 58 mutually exclusive, a set of communication protocols have been adopted in the invention. These protocols are implemented by fully interlocked receive inhibit and transmit inhibit signals.

Figure 11:
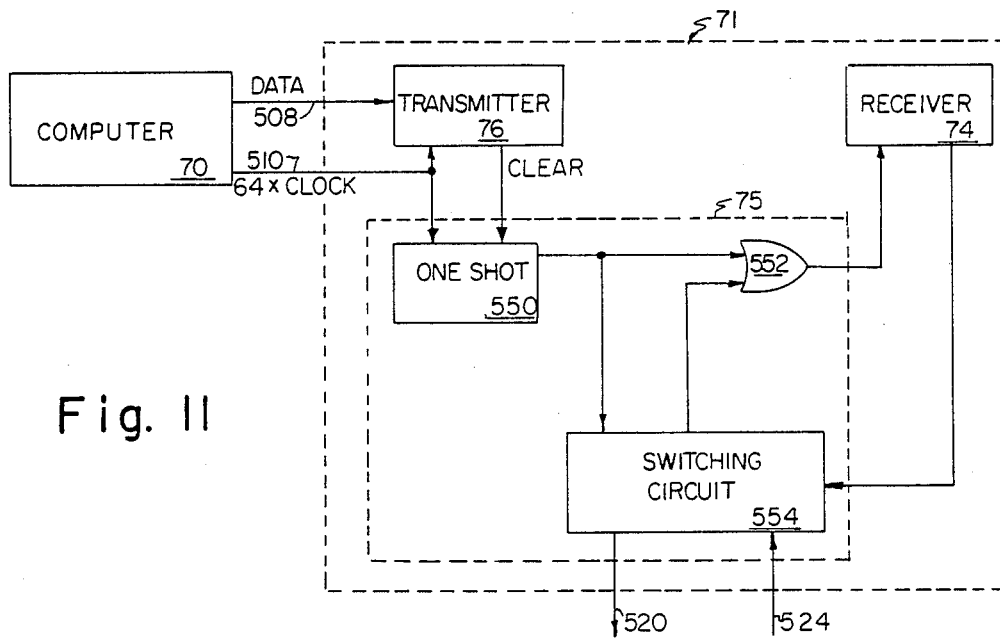
FIG. 11 is a block diagram showing the relationship between the computer, the transmitter, the receiver and the receiver control.

One protocol for transmission gives priority to all transmissions of the vehicle traffic control computer 70. No data is transmitted by any vehicle 58 when data is being transmitted by the vehicle traffic control computer 70. All data transmitted by the vehicle traffic control computer 70 is transmitted globally, that is, it is transmitted by each and every communication circuit 71 on the floor network and is carred on each guidewise, such as guide wires 48 through 56, regardless of the vehicle 58 to which it is directed. However, because the guidewires 48 through 56 are used both as transmitting antennas and as receiving antennas, any transmission by the vehicle traffic control computer 70 is picked up by the receiver sections 74 of each communication circuit 71. To avoid feedback, the system interrupts the output of each receiver section 74 before it is communicated to the vehicle traffic control computer 70. Referring now to FIG. 11, whenever the vehicle traffic control computer 70 transmits data, it also transmits a 64 X clock signal. This signal is sensed by a one shot circuit 550, which then transmits a signal via line 572 throughout the system which interrupts the output of the receiver section 74 at a synchronized clock divider 366 and an output register 372 and at retriggerable one shot 352.

To avoid data collision, a vehicle 58 only attempts to transmit data to the vehicle traffic control computer 70 when it has been polled by the vehicle traffic control computer 70. When a vehicle 58 begins to transmit data, the transmission is picked up by a particular guide wire 52 and is carried to a particular receiver section 74 in a particular communication circuit 71 in a particular enclosure 44. Reception of data by a receiver section 74 is detected as more fully described below and an inhibit reception signal is sent to all other communication circuits 71 in the system. This has the effect of interrupting the output of all receiver sections 74 in the system except that receiver section 74 which was first in time to begin receiving data. As a consequence, only data from one particular vehicle 58 will be recieved by the vehicle traffic control computer 70 at any particular time.

The vehicle traffic control computer 70 and the subsets of communication circuits are connected to one another through standard RS422 ports. These configurations are well known in the industry. A representative port would be the Motorolla MC3486P and MC3487P. A port should be used between any set of circuits which is separated by any significant distance. In the preferred embodiment, an RS422 port was chosen because of the selected frequencies. However, if other frequencies were selected, other standard ports or port configuration would be appropriate, such as RS232 port. Because the use of these ports is well known in the art, further discussion is omitted.

The communication circuits in any enclosure may be connected together through a bus. Moreover, the communication circuits may be embodied on one or more circuit boards in accordance with prior art. Where a bus is employed, prior art teaches that bus drivers or buffers may be necessary. Since this technology is well known in the prior art, they are generally omitted in the discussion of the circuits herein.

The communication links between components of the guide wire communication system are shown in block diagram form in FIG. 10. The vehicle traffic control computer 70 is connected to a plurality of primary enclosures via communication ports. In the preferred embodiment, the ports comprise RS422 standard communication ports. The primary enclosure 502 contains a set of communication circuits 71. The primary enclosure 502 is connected to the vehicle traffic control computer 70 by a cable containing at least lines 508, 510, 512 and 514. Line 508 is used to transmit data from the vehicle traffic control computer 70 to the primary enclosure 502, and, as will be explained hereafter, from the primary enclosure 502 to a plurality of secondary enclosures, for example, secondary enclosure 504 and secondary enclosure 506. Line 510 carries a timing signal from the vehicle traffic control computer 70 to the primary enclosure 502 which is also transmitted to secondary enclosures such as secondary enclosure 504 and secondary enclosure 506. Line 512 carries a clock signal from primary enclosure 502 to the vehicle traffic control computer 70. In the preferred embodiment, this signal is 9600 cycles per second, equivalent to the effective BAUD rate of data transmission across the guide wires 48 through 56. This signal is produced in the transmitter section 76 of a communication circuit 71. In the transmitter section 76, two divide-by-16 counters 174 and 176 are provided with an input from the 64 X clock, carried on line 510. A single voltage pulse is produced at pin 9 of divide by 16 counter 176 for each 64 pulses provided by the 64 X clock. In the preferred embodiment, this produces a clock frequency of 9600 Hz which is fed back to the vehicle traffic control computer 70 across line 512 for the purpose of providing synchronized timing. Such synchronized timing is a function of the vehicle traffic control computer 70 and is known in the prior art. Computer 70 may be an Intel 310. Line 514 carries data received by any of a plurality of receiver sections 74 in any enclosure throughout the system.

Primary enclosure 502 is connected through a plurality of ports to a plurality of secondary enclosures such as secondary enclosures 504 and 506. In the preferred embodiment these ports are RS422 ports, but as set forth above, other standard or non-standard ports may be utilized. There are five lines connecting a primary enclosure 502 and a secondary enclosure, such as secondary enclosure 504. Line 516 carries data from any of a plurality of receiver sections 74 to the primary enclosure 502. Internal to primary enclosure 502, line 516 is connected by a bus to any similar line such line 526 and to line 514, which carries data to the vehicle control computer 70. Line 516 is electrically equivalent to line 514, and carries a subset of the data carried by line 514.

Line 518 is connected by a bus internal to the primary enclosure 502 to similar lines such as line 528 and to line 508. Line 518 is equivalent to line 508 and carries the same data as is carried on line 508.

Line 522 is connected by a bus internal to the primary enclosure 502 lines such as to line 532 and to line 510 and is used to carry the 64 times clock signal. The signals on each of lines 510, 522 and 532 are equivalent.

Line 520 is used to interrupt the output of any receiver section 74 contained in enclosure 504 or in any enclosure logically subordinate to enclosure 504. Line 520 carries a signal whenever the 64 X clock is activated which implies that the vehicle traffic control computer 70 is transmitting, or when any receiver section 74 has begun receiving data from a vehicle and the receiver 74 is not located either in enclosure 504 or in any enclosure logically subordinate to enclosure 504.

If a transmission is received by a receiver section 74 contained in enclosure 504, for example, a signal will be generated which will interrupt the output of all other receiver sections 74 contained in enclosure 504. A signal will also be transmitted across line 524 to the primary enclosure 502. In enclosure 502, the signal is transmitted via lines such as line 530 to all other secondary enclosures except the originating secondary enclosure 504 and all enclosures which are subordinate to secondary enclosure 504. The signal is also transmitted by secondary enclosure 504 to all enclosures subordinate to secondary enclosure 504. The transmission of an inhibit receive signal interrupts the output of all receiver sections 74 except that receiver section 74 which was first in time to receive data.

The manner of connecting enclosures can be extended in a logical tree architecture. As to any enclosures connected below a secondary enclosure such as secondary enclosure 504 and, therefore, logically subordinate to it, secondary enclosure 504 would perform the same functions that primary enclosure 502 performs with respect to secondary enclosure 504.

The operation of line 520 and lines such as line 524, for example, are controlled by a receiver control circuit 75 which is provided in connection with each communication circuit. A receiver control ciruit 75 is more particularly described below, in connection with FIG. 11 which shows a block diagram of a single communication circuit with connections as if that communication circuit were located in primary enclosure 502. As explained above, the operation of the circuit in any subordinate enclosure is analogous, requiring the substitution of the relevant line numbers. The vehicle traffic control computer 70 transmits data to the communication circuit 71 over line 508 and a 64 X clock signal over line 510. Inside the communication circuit 71, line 510 is connected to both the transmitter section 76 and the receiver control circuit 75. The transmitter section 76 is configured to provide a signal from a retriggerable one shot 170 on line 561 which clears a retriggerable one shot 550 in the receiver control circuit 75. The retriggerable one shot 550 is also connected to the 64 times clock by way of line 510. Said retriggerable one shot 550 is activated whenever the 64 time clock signal is present on line 510. The output of the retriggerable one shot circuit 550 is sent to both an OR gate 552 and a switching circuit 554 whose operation shall be described in more detail below. The OR gate 552 receives an additional output from the switching circuit 554. The output of the OR gate 552 is connected to the receiver section 74, and in particular, to retriggerble one shot 352 and flip-flops 366 and 372 via line 575. A true state produced by the OR gate 552 prevents the output of the receiver section 74 from being communicated to the vehicle traffic control computer 70. The switching circuit 554 receives an input from the retriggerable one-shot circuit 550, and from the receiver section 74 via lijnes 577, and from subordinate enclosures such as secondary enclosure 504 via line 524, for example, and from other communication circuits in the same enclosure via the bus 579. If the switching circuit 554 receives a signal from any of the aforementioned sources, (the retriggerable one-shot circuit 550, the receiver section 74, line 524 or the bus 579), it will output a signal on line 520 which will shut off the output of any receiver sections in any communication section subordinate to it. If a signal is received by the switching circuit 554 on line 524, the switching circuit will generate a signal to the OR gate 552 which will prevent output of the receiver section 74.

Figure 12:
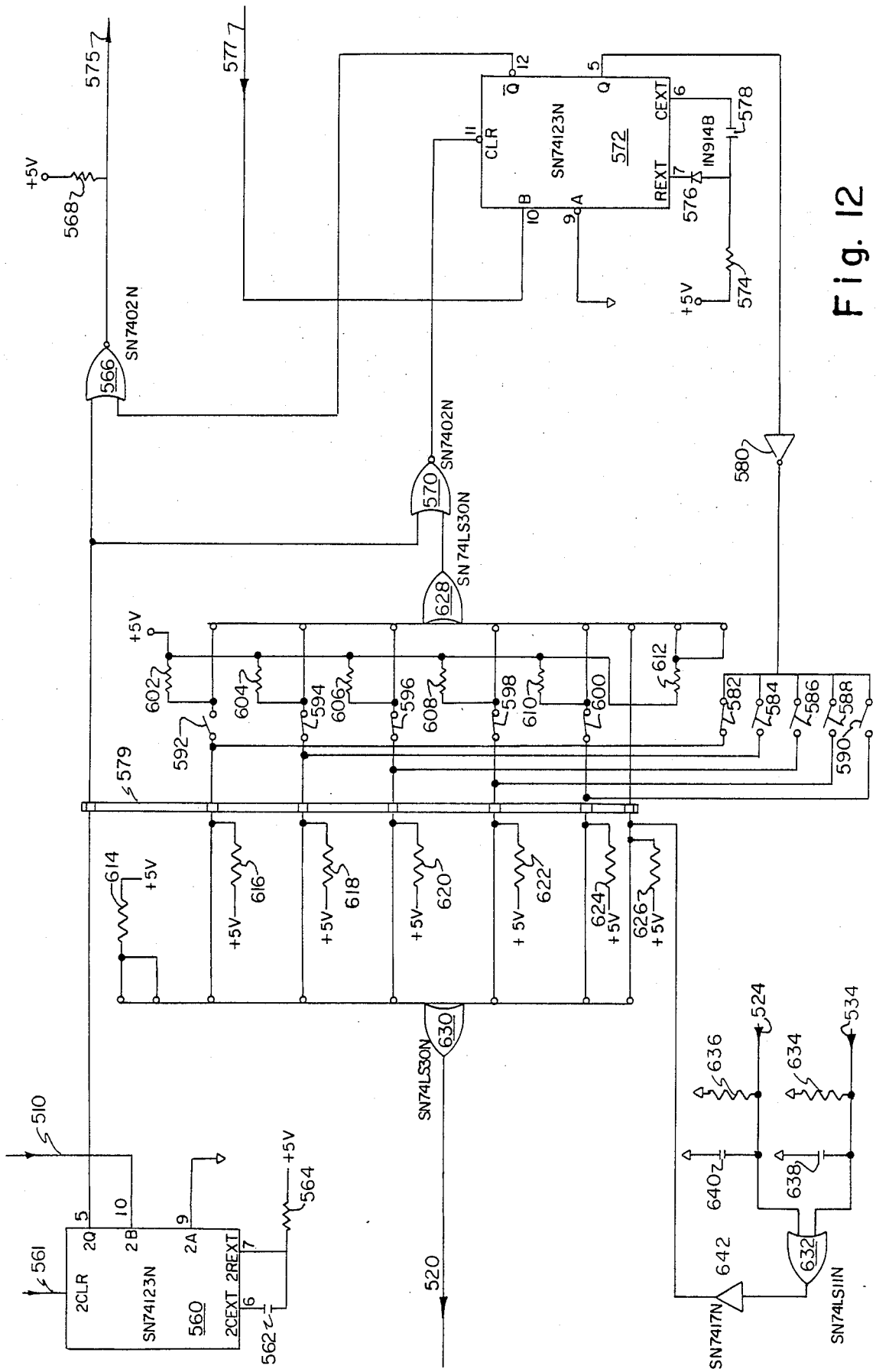
FIG. 12 is the receiver control circuit diagram.

An exemplary embodiment of the receiver control circuit 75 and in particular the switching circuit 554 is set forth below with reference to FIG. 12.

The receiver control circuit 75 receives a 65 X clock signal on line 510 to a retriggerble one shot 560 such as an SN74123N. The retriggerable one shot 560 is provided with capacitor 562 and resistor 564 which adjust the time constant of the retriggerable one shot 560. The retriggerable one shot 560 is also provided with a connection to the transmitter section 74 and specifically to retriggerable one shot 170 via line 561 so that retriggerable one shot 560 can be cleared before the transmission of a new data bit through the transmitter section 74. The output of the retriggerable one shot 560 is carried to OR gates 566 and 570, which may be integrated circuits such as SN7402N available from National Semiconductor. OR gate 566 is also connected to a retriggerable one shot 572 which may be a SN 74123N and whose function will be explained in detail below. The output of OR gate 566 indicates that either the vehicle traffic control computer 70 is transmitting data or that another receiver section in the floor circuit is receiving data and turns off the output of the receiver section 74 via line 574 as described above. Resister 568 is provided as a pull-up resistor according to the prior art.

OR gate 570 produces a true output whenever the vehicle traffic control computer 70 is transmitting data or any other receiver section is receiving data. A true output of OR gate 570 clears retriggerable one shot 572. The cleared state of retriggerable one shot 572 produces a positive output which is conducted to OR gate 566. The function or OR gate 566 is described above. Retriggerable one shot 572 is also provided with an input from the digital circuit 116 of the receiver section 74 via line 577. When the receiver section 74 is receiving data, the aforesaid input is a stream of pulses at a rate at least twice as fast as the slowest communication frequency. The time constant of retriggerble one shot 572 is set by means of resistor 574, diode 575 and capacitor 578 to respond to pulse streams with rates at least as high as the rate associated with the lowest communication frequency. In the preferred embodiment, the lowest communication frequency is 9600 Hz. The output of retriggerable one shot 572 is communicated by means of a bus 579 in the preferred embodiment. In the preferred embodiment, each receiver control circuit 75 is provided with a plurality of switches 582 through 600 which are used to configure the communication circuit 71 so that a plurality of communication circuits may be connected in a single enclosure such as primary enclosure 502. In the example in FIG. 12, two sets of five switches are shown which would permit up to five communication circuits 71 to be inserted in any particular enclosure, such as primary enclosure 502. A greater or lesser number of switches could be provided, however. In accordance with prior art, pull-up resistors 602 through 612 and 614 through 626 are provided to accommodate the transfer of data across the bus 579. When a transmission is received in receiver section 74, all other receiver sections contained in the same enclosure have their output interrupted as described below. In FIG. 12, only switch 592 of the set of switches 592 through 600 is shown to be open. In another receiver control circuit contained within the same enclosure, the switch analogous to switch 592 would be closed and one of the other switches 594 through 600 would be open. The bus 579 hard-wire OR's the analogous switches in the plurality of receiver control circuits in any particular enclosure together. Therefore, when a signal is produced by retriggerable one shot 572 in the circuit shown, it is transmitted in its companion receiver control circuits within the same enclosure across switch 592 and a signal is produced at the input of OR gate 628. The use of switches 592 through 600 prevent receiver section 74 from causing receiver control circuit 75 to turn off the output of its own receiver.

Whenever a signal is produced by a retriggerable one shot such as retriggerable one shot 572 by any of the plurality of communication circuits 71 within a particular enclosure, the signal or signals are communicated across the bus 579 to the input of OR gate 630. The output of OR gate 630 is a communication line such as line 520. In the preferred embodiment, when a plurality of communication circuits 71 are contained in a single enclosure, not all communication circuits will be connected to a line such as line 520. By reason of the use of bus 579 and OR gate 630, each of the plurality of communication circuits contained within an enclosure such as primary enclosure 502 would provide identical output for use on a line such as line 520. Insofar as the particular OR gate 630 is not used in a particular configuration, it could be omitted in practice. At least one communication circuit 71 in any particular enlosure should be provided with an OR gate 630 and its associated inputs.

Receiver control circuit 75 is also provided with an input from a communication line such as line 524. A signal on a line such as line 524 indicates that a receiver physically located in some other enclosure is receiving data. A plurality of lines such as line 524 or line 534 are connected to an OR gate 632. Pull-up resistors such as resistors 634 and 636 in accordance with prior art are shown. Capacitors 638 and 640 induce a slight time delay in the received signal. OR gate 632 may be, for example, a SN74LS11N available from Texas Instruments. The output of OR gate 632 is buffered through integrated circuit 642 which may be an SN57417N from Texas Instruments and is then connected through the bus 579 to the inputs of both OR gate 628 and OR gate 630. If a true state is produced at the output of OR gate 632, it is transmitted to other enclosures through OR gate 620. The outputs of all receiver sections within the enclosure containing receiver control circuit 75 are interrupted by reason of a true state at the output of a plurality of OR gates such as OR gate 628 contained in each of a plurality of receiver control circuits 75 in a particular enclosure.

Figure 13:
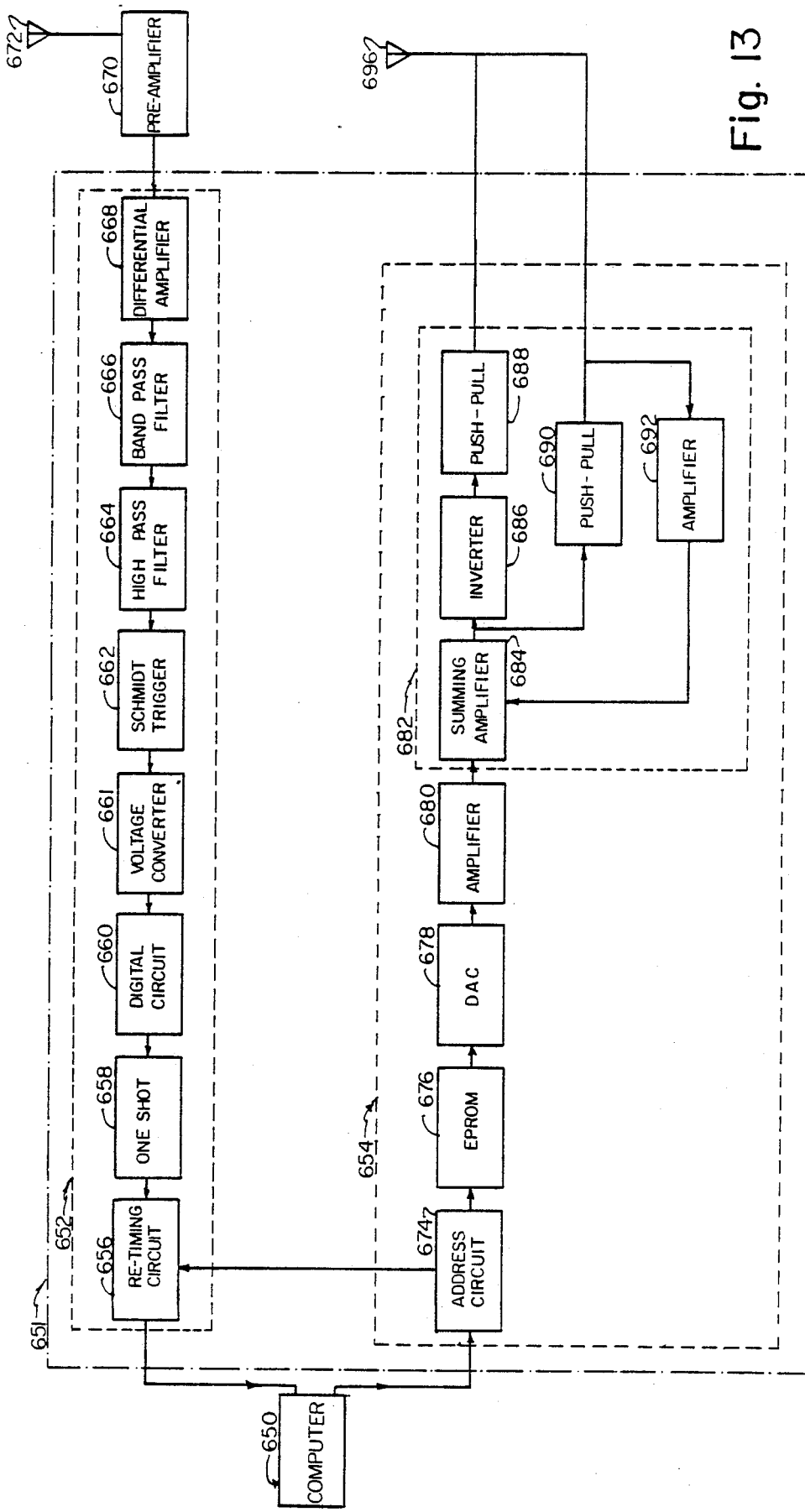
FIG. 13 is a block diagram of the vehicle communication electronics.

Each vehicle 58 is provided with a vehicle communication circuit substantially identical in function to the receiver section 74 and the transmitter section 76 of the communication circuit 71. The operation of the vehicle communication circuit 651 is explained in connection with FIG. 13. Differences between the communication circuit 71 and the vehicle communication circuit 651 will be pointed out.

Because only one vehicle communication circuit 651 is provided on any particular vehicle 58 in the preferred embodiment, no receiver control section analogous to receiver control section 75 in the communication circuit 71 is provided. Moreover, no circuit analogous to the line driver section 72 is required by the vehicle. In the preferred embodiment, the vehicle receiver section 652 is provided with an antenna 672 and the vehicle transmitter section 654 is provided with a separate antenna 696. For this reason, therefore, a junction such as junction 78 in the communication circuit 71 is not provided. The output of the vehicle receiver section 652 is interrupted from communication with the vehicle computer 650 whenever the vehicle transmitter section 652 is transmitting.

Having described certain differences between the vehicle communication circuit 651 and the communication circuit 71, a more detailed description of the vehicle communication circuit 651 will be set forth below. Reference is made to the description of circuits and circuit components set forth in connection with the description of the communication circuit 71. In accordance with prior art, the values for the capacitors and resistors contained in vehicle communication circuit 651 are generally different from those in communication circuit 71 in order to tune the vehicle communciation circuit 651 for optimum performance. Different values are required for the various resistors and capacitors, as taught by prior art, because the communication circuit 71 is associated with a particular guide wire 80 which has a peculiar configuration dependant upon the disposition of the guide wire. Since guide wire 80 serves as an antenna for the communication circuit 71, its characteristics as an antenna are clearly altered by the particular layout chosen. In the vehicle communication circuit 651, on the other hand, the vehicle receiver section 652 and the vehicle transmitter section 654 have separate antennas 672 and 696 associated with each section. The characteristics of these antennas 672 and 669 are different from each other and from the guide wire 80. As taught by prior art, the values of resistors, capacitors and inductors in the disclosed circuits should be chosen to optimize performance, particularly with respect to the varying antenna characteristics pointed out above.

Each vehicle 58 is provided with a vehicle computer 650 such as a Intel 88/25, which is connected to a vehicle communication circuit 651. When data is transmitted from a guide wire such as guide wire 52 to a vehicle 58, it is detected by an antenna 672 which is provided with a plurality of preamplifier stages 670 in accordance with prior art. An appropriate amplifier 110 is disclosed in connection with the receiver section 74. The signal from the preamplifier 670 is carried to a vehicle receiver section 652 which comprises a vehicle differential amplifier 668, a vehicle band pass filter 666, a vehicle high pass filter 664, a vehicle Schmidt trigger 662, a vehicle voltage converter 661, a vehicle digital circuit 660, a vehicle one shot circuit 658 and a vehicle re-timing circuit 656. The output of the vehicle receiver section 652 is communicated to the vehicle computer 650. In accordance with prior art, a communication port such as a standard RS 422 port may be provided between the vehicle receiver section 652 and the vehicle computer 650. Operation of the vehicle differential amplifier 668 is disclosed in connection with the differential amplifer 104 above. Similarly, the vehicle band pass filter 666, the vehicle high pass filter 664, the vehicle Schmidt trigger 662, the vehicle voltage converter 661, the vehicle digital circuit 660, the vehicle one shot 658 and the vehicle retiming circuit 656 are disclosed above in connection with the band pass filter 106, the high pass filter 108, the Schmidt trigger 112, the voltage converter 114, the digital circuit 116, the one shot 118 and the retiming circuit 120 of the receiver section 74, respectively. It will be noted that the receiver section 74 contains an amplifier 110 which is not included in the preferred embodiment of the vehicle receiver section 652. Although an amplification stage could be provided within the frame work of the invention, in the preferred embodiment the preamplifier 670 has been found to provide sufficient amplification for purposes of the vehicle receiver section 652.

When data is transmitted from a vehicle 58 to the vehicle traffic control computer 70, such data is generated at the vehicle computer 650. It is then communicated to a vehicle transmitter section 654. In accordance with prior art, a suitable communication port such as an RS422 port may be provided between the vehicle computer 650 and the vehicle transmitter section 654. The circuitry and operation of the vehicle transmitter section 654 is disclosed with reference to the transmitter section 76 described above. The vehicle transmitter section 654 comprises a vehicle address circuit 674, a vehicle erasable programmable read only memory 676 (EPROM), a vehicle digital-to-analog converter 678 (DAC), a current to voltage converter 680 and a vehicle push-pull amplifier 682. The vehicle push-pull amplifier 682 comprises a vehicle summing amplifier 684, two vehicle push-pull circuits 688 and 691, one of which is provided with a vehicle inverter 686, and a vehicle feed back amplifier 692 which is connected between the output of one vehicle push-pull circuit such as 690 and the vehicle summing amplifier 684. The circuitry and operation of the vehicle address circuit 674, the vehicle EPROM 676, the vehicle DAC 678, the vehicle amplifier 680 and the vehicle push-pull amplifier 682 are disclosed above in connection with the address circuit 82, the EPROM 84, the DAC 86, the amplifier 88, and the push-pull amplifier 90 in connection with the transmitter section 76 above.

Figure 14:
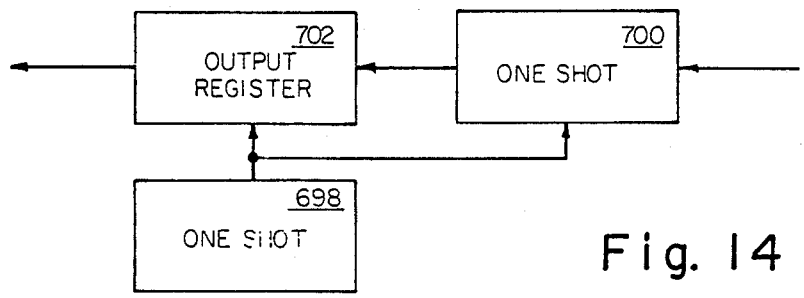
FIG. 14 is a block diagram of a portion of the vehicle communication electronics.

The output of the vehicle transmitter section 654 is connected to a transmit antenna 696 which will be more particularly described below. The address vehicle circuit 674 of the vehicle transmitter section 654 contains a retriggerable one shot 698 which is shown in block diagram form in FIG. 14. The functioning of retriggerable one shot 698 corresponds to the function of retrigerable one shot 170 in the transmitter section 76. As described above in connection with the receiver control section 75, retriggerable one shot 698 is connected to a one shot 700 and an output register 702 contained in the vehicle retiming circuit 656. The operation of retriggerable one shot 698, one shot 700, and output register 702 correspond to the functions of the retriggerable one shot 170, one shot 366 and output register 372 described above in connection with the communication circuit 71. The purpose of this connection is to interrupt the output of the vehicle receiver section 652 whenever the vehicle transmitter section 654 is operational.

Figure 15:
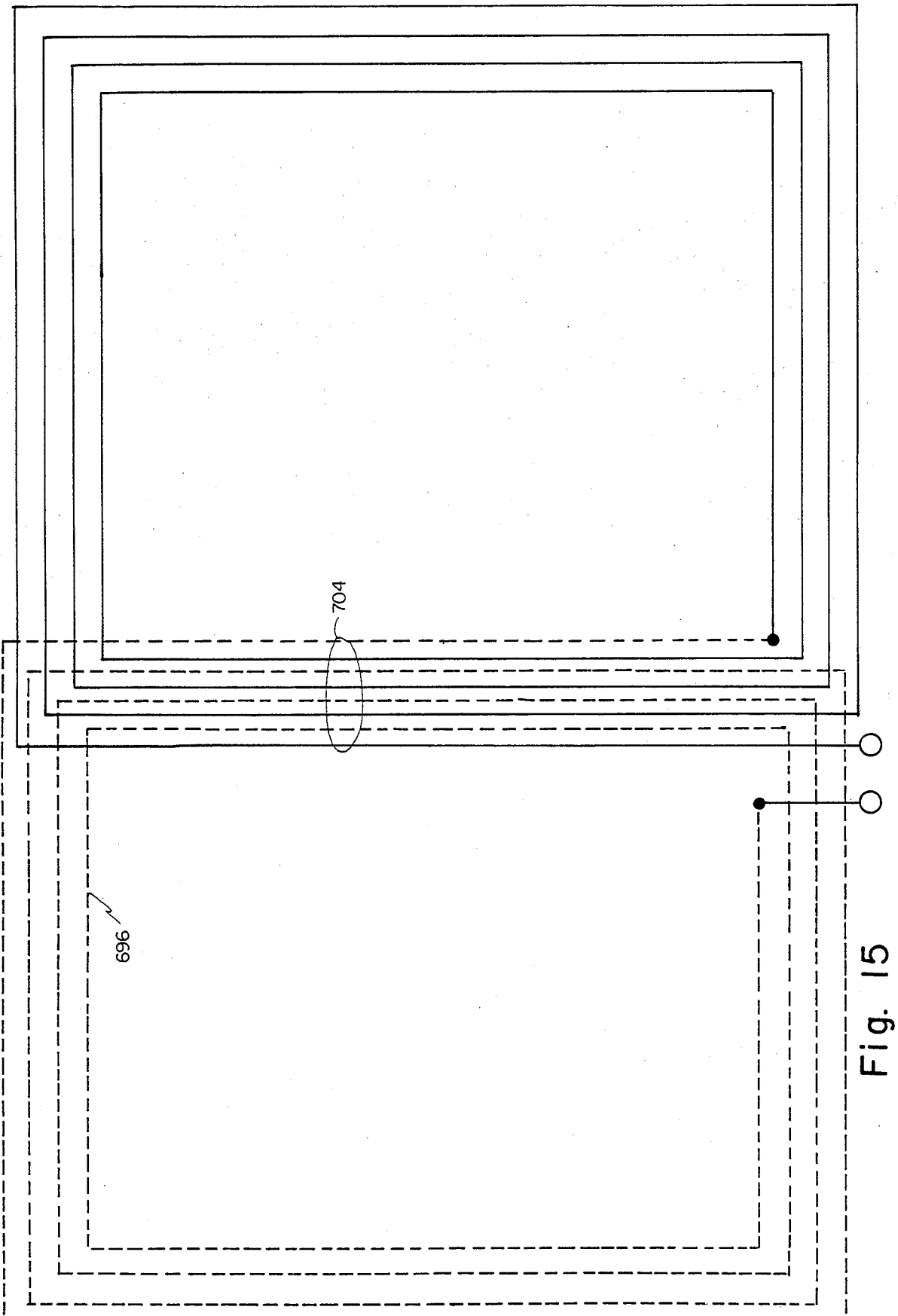
FIG. 15 is a schematic representation of a vehicle antenna, in accordance with the present invention.
Figure 18B:
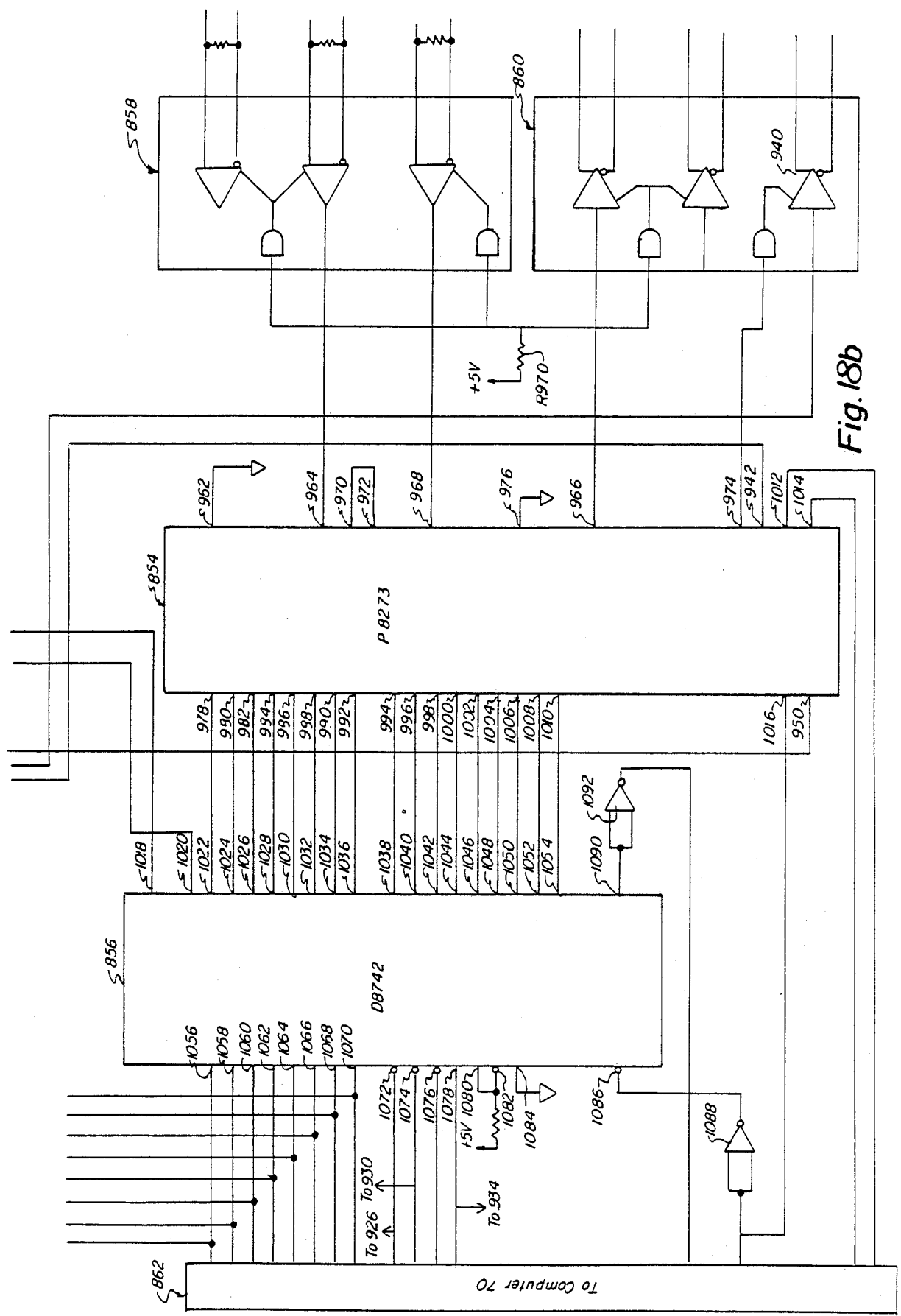
FIG. 18b is the second portion of the circuit diagram of the dedicated microcomputer memory circuit, the block diagram of which is illustrated in FIG. 17.

The vehicle transmitter section 654 is provided with a low frequency, high gain transmit antenna 696. The transmit antenna 696 is depicted in FIG. 15 and is comprised of a substantially figure 8 pattern of conductors. In the preferred embodiment, the transmitter antenna 696 is disposed generally along the bottom of a vehicle 58 in such a manner that the central bar 704 of the transmit antenna 696 is positioned substantially parallel to the guide wire 52 which is embedded in the floor beneath the vehicle 58. The conductor in the transmit antenna 696 is wound in the disclosed figure 8 pattern in such a manner that all currents in the sections of the conductor lying along the central bar 704 will flow in the same direction. In the preferred embodiment, the transmit antenna 696 is comprised of 20 turns of conductor disposed 10 turns on the upper half of figure 8 and ten turns of the lower half of the figure 8. The transmit antenna is constructed to obtain the maximum possible length for the central cross bar 704. If the vehicle 58 is segmented, or in any other manner prevents a single antenna from being deployed substantially the entire length of the vehicle 58, a plurality of transmit antennas 696 may be deployed along the length of the vehicle.

In the preferred embodiment, the transmit antenna 696 is constructed by applying conducting material to a non-conducting material such as printed circuit board material using methods common in the art for the construction of printed circuit boards.

In order to implement the guide wire communication system, the vehicle traffic control computer 70 is provided with programming which permits it to compose a message. Messages contain coded directions for the operation of the vehicle. Messages can be sent by the vehicle traffic control computer 70 either globally, that is to all vehicles currently in communication with the vehicle traffic control computer 70, or a message can be addressed to a specific vehicle. All messages from the vehicle traffic control computer 70 are carried on all guide wires in the system which has a star architecture implementation of which is described above. The guide wire communication system uses a multidrop method of communiation. That is, a plurality of vehicles may be on any guide wire at any time. All messages from the vehicle traffic computer 70 are received by all vehicles on the system, but each vehicle 58 ignores all messages except those designated global or those addressed to the specific vehicle 58. Messages have two formats: command messages which provide directions to the vehicle 58 for tasks to be performed, and polling messages which request the current status of a vehicle. A vehicle 58 transmits data to the vehicle traffic control computer 70 only after it has been first individually addressed by the vehicle traffic control computer 70. Thus, in the system the vehicle traffic control computer 70 is a master and the vehicles 58 are slaves. The fact that vehicles transmit messages only in response to a message from the vehicle traffic control computer 70 prevents communication collisions in the data which would occur if a plurality of vehicles attempted to communicate with the vehicle traffic control computer 70 simultaneously. When an individual vehicle 58 receives a polling message or a command message from the vehicle traffic control computer 70, it is permitted by its vehicle computer 650 to attempt to transmit a precomposed coded message to the vehicle traffic control computer 70 acknowleging the receipt of the message and reporting the vehicle status. Messages are sequentially ordered. The vehicle computer 650 checks the message sequence. If a message is received which has the same sequence number as the previous message, the second message will be discarded. If a message is received out of sequence, an error condition results. The vehicles are stopped and operator intervention is required. If vehicle traffic control computer 70 does not receive an acknowledgement of receipt of its message by a vehicle 58, it will re-transmit the message.

The vehicle computer 650 is further provided with memory for queing a plurality of messages from the vehicle traffic control computer 70. Based on predetermined parameters which are determined with reference to a specific embodiment of the invention, the vehicle computer 650 reports the estimated time required for the vehicle 58 to execute the active task assigned to the vehicle 58 by the the vehicle traffic control computer 70 as contained in the memory queue. The memory queue is organized on a first in, first out basis. The estimated completion time of the current task at the top of the queue is transmitted from the vehicle 58 to the vehicle traffic control computer 70 whenever the vehicle 58 acknowledges receipt of a message and reports its status. Based on the reported estimated time of completion, the vehicle traffic control computer 70 will generally not request a status report from a particular vehicle 58 until the estimated completion time of the vehicle has elapsed. At longer intervals, all vehicles in the system are also polled serially in accordance with prior art. This assures that all vehicles in the system are polled from time to time.

The plurality of guide wires comprising the system are divided into various zones by bench marks which may consist, for example, of magnets embedded in the floor which are detected by means of sensors carried on each vehicle in accordance with the prior art into various zones. These zones are designated in the present invention as resources. The vehicle traffic control computer 70 is provided with tables which associate resources with possible tasks which can be assigned to a vehicle 58. When the vehicle traffic control computer 70 transmits a message to a vehicle 58 in which the vehicle is assigned a task, the vehicle traffic control computer 70 also allocates to that vehicle 58 various codes representing the resources necessary for the completion of such task. The codes representing resources are uniquely assigned to a particular vehicle until that vehicle reports that its task is completed and reallocates the particular resource to the vehicle traffic control computer 70. Use of resource allocation permits a plurality of tasks to be assigned to a particular vehicle without overlapping tasks between two or more vehicles.

GUIDE-WIRE TRAFFIC CONTROL SYSTEM WITH DEDICATED MICROCOMPUTER MEMORY

A communication circuit 73 is shown in block diagram form in FIG. 17 with an optional dedicated microcomputer memory 850. In order to keep transmissions and reception from both the vehicle traffic control computer 70 and each of a plurality of vehicles 58 mutually exclusive, a set of communication protocols can be used, described more fully above. The protocols are implemented by fully interlocked receive inhibit and transmit inhibit signals.

The described protocol for data transmission gives signals to all transmissions of the vehicle traffic control computer 70. No data is transmitted by any vehicle 58 when data is being transmitted by the vehicle traffic control computer 70. All data transmitted by the vehicle traffic control computer 70 is transmitted globally, that is, it is transmitted by each and every communication circuit 71 on the floor network and is carried on each guide wire, such as guide wires 48 through 56, regardless of the vehicle 58 to which the data is directed.

To avoid data collision, a vehicle 58 only attempts to transmit data to the vehicle traffic control computer 70 when it has been polled by the vehicle traffic control computer 70. When a vehicle 58 begins to transmit data, the transmission is picked up by a particular guide wire 52 and is carried to a particular receiver section 74 in a particular communication circuit 71 in a particular enclosure 44. This has the effect of interrupting the output of all receiver sections 74 in the system except that receiver section 74 which was first in time to begin receiving data. As a consequence, only data from one particular vehicle 58 will be received by the vehicle traffic control computer 70 at any particular time.

The vehicle traffic control computer 70 and the subsets of communication circuits 73 are connected to one another through standard RS 422 ports. These configurations are well known in the industry. A representative port would be the Motorolla MC3486P and MC3487P. A port should be used between any set of circuits which is separated by any significant distance. In the illustrated embodiment, an RS 422 port was chosen because of certain communication frequencies were selected. However, if other frequencies were selected, other standard ports or port configurations would be appropriate, such as an RS 232 port. Because the use of these ports is well known in the art, further discussion is omitted.

The communication circuits in any enclosure may be connected together through a bus. Moreover, the communication circuits may be embodied on one or more circuit boards in accordance with prior art. Where a bus is employed, prior art teaches that bus drivers or buffers may be necessary. Since this technology is well known in the prior art, they are generally omitted in the discussion of the circuits herein.

COMMUNICATION PROGRAM FOR TRAFFIC CONTROL GUIDE WIRE SYSTEM

In order to implement the guide wire communication system, the vehicle traffic control computer 70 is provided with programming which permits it to compose a message. Messages contain coded directions for the operation of the vehicle 58. Messages can be sent by the vehicle traffic control computer 70 globally, that is, to all vehicles currently in communication with the vehicle traffic control computer 70, or a message can be addressed to a specific vehicle 58. All messages from the vehicle traffic control computer 70 are carried on all guide wires in the system.

The guide wire communication system uses a multi-drop method of communication. That is, a plurality of vehicles may be on any guide wire at any time. All messages from the vehicle traffic computer 70 are received by all vehicles on the system, but each vehicle 58 ignores all messages except those designated global or those addressed to the specific vehicle 58.

Messages have two formats: command messages which provide directions to the vehicle 58 for tasks to be performed, and polling messages which request the current status of a vehicle. A vehicle 58 transmits data to the vehicle traffic control computer 70 only after it has been first individually addressed by the vehicle traffic control computer 70. Thus, in the system the vehicle traffic control computer 70 is a master and the vehicles 59 are slaves. The fact that vehicles 58 transmit messages only in response to a message from the vehicle traffic control computer 70 prevents commmunication collisions in the data which would occur if a plurality of vehicles attempted to communicate with the vehicle control computer 70 simultaneously.

When an individual vehicle 58 receives a polling message or a command message from the vehicle traffic control computer 70, the vehicle 58 can attempt to transmit a precomposed coded message to the vehicle traffic control computer 70 acknowledging the receipt of the message and reporting the vehicle status. Messages are sequentially ordered. When a message is received by a vehicle, the vehicle 58 checks the message sequence number. If a message is received which has the same sequence number as the previous message, the second message will be discarded. If a message is received out of sequence, an error condition results. The vehicles are stopped and operator intervention is required. If the vehicle traffic control computer 70 does not receive an acknowledgement of receipt of a message by a vehicle 58, it will re-transmit the message.

In the illustrated embodiment, the guide wire communication system employs a subset of SDLC protocol available from Intel Corporation and implemented with an 8273 chip available from Intel as a dedicated function peripheral. Although the manner of inserting an 8273 chip in many computers is well-known in the art, a specific, novel implementation providing additional memory using a dedicated micro-computer memory will be discussed in greater detail below.

The modified SDLC employed herein comprises a bit-oriented protocol, that is, a protocol wherein a receiver, such as computer 70, can recognize a beginning-of-message or an end-of-message flag at any time. This implies that messages can be of any selected length. The capability of employing a bit-oriented protocol is provided by the hardware structure described. In the context of guide wire communication systems, prior art systems have been unable to employ flexible protocols such as SDLC with associated advantages in throughput.

A message 820 composed using basic SDLC protocol comprises an opening flag 822, an address field 824, a control field 826, an information field 828, a frame check sequence 830 and a closing flag 832. Both the opening flag 822 and the closing flag 832 comprise a series of bits comprising a zero followed by six contiguous one bits followed by a closing zero bit. To avoid the inadvertent occurrence of a pattern of six contiguous one bits in any other segment, a protocol controller automatically inserts a zero after any occurrence of five contiguous one bits where such pattern is not a part of either an opening flag 822 or a closing flag 832. A data receiver, such as an computer 70, provided with an Intel 8273 protocol controller, automatically removes any zero following five consecutive one bits. Inserted and deleted zero bits are not counted in error determination, discussed below.

The address field 824 permits the computer 70 to direct messages to specified devices such as a vehicle 58. SDLC is particularly well-adapted for use in the present invention. Standard SDLC protocol specifies two types of receivers, to wit, primary and secondary. In general, there is one predetermined primary station, such as computer 70, and all other stations, such as vehicle 58, are designated as secondary stations. A secondary station, such as vehicle 58, transmits a message only when queried by the computer 70. To specify a particular vehicle 58, each vehicle 58 is assigned a unique 8 bit address which is contained in address field 824. To poll a secondary station, the computer 70 places the secondary station's address in the address field. When responding, the secondary station places its own address in the address field. The primary receiver, such as computer 70, is not identified. Moreover, a common or global address is provided so that all secondary receivers may be globally addressed. It is common to use an all one-bit address field for the common address.

The control field 826 comprises eight bits following the address field 824. The control field comprises link level control commands for SDLC, in accordance with prior art available from Intel Corporation or from International Business Machines Corporation.

The information field 828 comprises a string of bits of any arbitrary length and comprises the actual data being transmitted or received by vehicle 58 or the computer 70. The information field 828 comprises one or more messages. The messages comprise a series of numeric codes for activities to be performed by a vehicle 58. Methods for assigning numerical codes on a one-to-one basis to selected tasks or activities is well known in the art of the computer programming and is not further herein described.

The frame check sequence 830 comprises sixteen bits immediately following the information field 828 and immediately preceding the closing flag 832. In accordance with the prior art, the frame check sequence 830 contains a unique number generated by a transmitting device, such as a vehicle 58, based on the contents of the address field 824, the control field 826 and the information field 828. A receiver such as computer 70 automatically calculates a similar number during the receipt of the message and compares the calculated number to the number received in the frame check sequence 830. If the two numbers do not match, the message is disregarded as containing an error.

DEDICATED MEMORY CIRCUIT FOR COMMUNICATION

Reference is now made to FIG. 17, wherein a suitable memory circuit generally designated 850 in accordance with the present invention is disclosed in block diagram. The memory circuit 850 permits messages 820 to be stored temporarily whereby message through-put can be optimized. Restated, the memory circuit 850 permits a communication circuit 73 to receive a high volume of messages 820 and to retain the messages 820 until they can be re-transmitted to a receiver, such as computer 70.

The memory circuit 850 comprises a clock circuit 852 for providing a plurality of clock signals, an SDLC chip 854 for encoding and decoding SDLC messages, a single chip computer 856 for buffereing messages and a plurality of RS 422 ports 858 and 860 for transmitting and receiving messages to or from the guide wires 48, described above. The memory circuit 850 is connected into a standard microcomputer 70, along a standard bus 862. The operation of a bus interface with the microcomputer is well known in the art and will not be described further herein.

The clock circuit 852 comprises a 24 MHz crystal 864 which is connected to ground through resistors R166 and R168 and which is similarly connected to the inputs 870 and 872 of a clock chip 874 such as P8284A available from Intel Corporation. Connections 876 through 892 on clock chip provide the requried external connections, in accordance with the prior art, to produce a plurality of clock signals, more particularly described below. The clock circuit 874 produces a clock output of 4 MHz at output pin 894; of 8 MHz at output pin 896; and of 24 MHz at output pin 898. The output of pin 894 is carried to the clock input pin 950 of the SDLC chip 854, the operation of which will be more fully described below.

The output of pin 896 is conducted to an inverter 900 such as SN74LS00N available from Texas Instruments, which performs the function of a buffer. The output of inverter 900 is connected to three clock inputs 902, 904, and 906 on a programmable clock chip 908 such as a P8254 available from Intel. The programmable clock chip 908 is used to set a baud rate in accordance with instructions received from the computer 70 over data lines 910 through 924. The programmable clock circuit 908 will receive instructions from the computer 70 whenever chip select line 926 and write line 930 are set low. The programmable clock circuit 908 will send data to the computer 70 whenever chip select line 926 and read line 928 are set low. The programmable clock circuit 908 ordinarily sets clock signals for a data transmission rate of 9600 baud in accordance with the prior art. The output of the programmable clock circuit 908 at line 936 is conducted to a 64 times clock output described above. In the illustrated embodiment, the mentioned signal is conducted through a switch circuit 940 of a standard RS 422 port 860, the operation of which will be more fully described below. An additional output on line 938 is conducted to a 32 times clock input 942 on the SDLC chip 854, as more fully described below.

Three gate inputs 941, 943 and 945 on programmable clock chip 908 are connected by line 944 to a high voltage through R956 to permit operation of the clock outputs 902, 904 and 906 on the programmable clock chip 908. The divide-by-two clock 946 may be an SN74LS74N available from Texas Instruments. The divide-by-two clock 946 is provided with a 24 MHz input signal at pin 948 from pin 898 of the clock chip 874. The divide-by-two circuit 946 produces two clock signals in complimentary phase at pins 952 and 954 which are connected to the single chip computer 856 as more particularly described below. The divide-by-two circuit 946 is further provided with appropriate power sources and pull-up resistors R956, R958, and R960 in accordance with the prior art, which resistors are connected to appropriate power sources such as a five volt power source as shown.

Reference is now made to the SDLC chip 854. The SDLC chip 854 is a standard P8273 chip available from Intel Corporation. The SDLC chip 854 is connected to the communications circuit 73 described above through standard RS 422 ports 858 and 860. In the illustrated embodiment, a clear-to-send pin 962 is continuously enabled through connection to ground. The receive data pin 964, transmit data pin 966 and transmit clock pin 968 are connected to RS 422 ports 858 and 860 and are continuously engaged by the operation of resistor R970 which is connected to an appropriate voltage source such as a five volt voltage source.

Input from the programmable clock 908 through 32 times clock pin 942 is processed internally by the SDLC chip 854 to provide relative timing in accordance with prior art. The relative timing produces a signal on the digital phase lock loop pin 970 which is hard wired to the receive external clock pin 972 whereby a consistent internal clock signal is maintained throughout the components of the memory circuit 850. When data is to be received by the SDLC circuit 854, an interrupt is sent by line 974 which interrupts the clock signal being transmitted through circuit 940 and disables transmitter circuits as described above.

In the illustrated embodiment, the carrier detect pin 976 is continuously engaged by hard wiring it to the ground. The SDLC chip 854 receives and transmits data along bi-directional lines connected to pins 978 through 992 from the single chip computer 856. The functioning of the SDLC chip 854 is controlled from the single chip computer 856 by a read pin 994, a write pin 996 and a chip select pin 998.

Appropriate registers in the SDLC chip 854 are specified from the single chip computer 856 by lines 1000 and 1002. An interrupt is generated when data is ready for reception by an output on pin 1008 and the interrupt is cleared when the interrupt is acknowledged on input 1004. An interrupt is generated when data is needed for output by an output on pin 1010 and the interrupt is cleared when the interrupt is acknowledged on input 1006. The configuration for SDLC of the SDLC chip 854 is set by signals from the computer 70 to pins 1002 and 1014 in a conventional manner.

The external computer 70 is also connected to the SDLC chip 854 through reset pin 1016. A signal on reset pin 1016 is generated to clear the functions of SDLC chip 854.

Reference is now made to the single chip computer 856 which may comprise a D8742 available from Intel Corporation. The single chip computer 856 receives two complimentary phase clock signals from the divide-by-two clock 946 on pins 1018 and 1020 for internal timing. The single chip computer 856 receives and transmits bytes of data to the SDLC chip 854 on bi-directional lines across pins 1022 through 1036.

The single chip computer 856 further controls the functioning of the SDLC chip 854 through pins 1038 through 1054. Pin 1038 transmits read data commands. Pin 1040 transmits write data commands. Pin 1042 transmits chip select commands. Pins 1044 and 1046 designate, in a conventional manner, particular registers within the SDLC chip where data is stored. Pins 1048 and 1050 confirm the transfer of receptions and transmissions, respectively. Pins 1052 and 1054 are used to initiate receive data interrupts and transmits data interrupts by the SDLC chip 854.

The single chip computer 856 receives data from the computer 70 through pins 1056 through 1070. The computer 70 also instructs the single chip computer 856 to read data through pin 1072 and to write data through pin 1074, respectively. In the illustrated embodiment, data pins 1056 through 1070 of the single chip computer 856 are joined at a common electrical connection with data pins 910 through 924 of the programmable clock 908 on a one-to-one basis. Similarly, read data pin 1072 has a common electrical connection with read data pin 926 and write data pin 1074 has a common electrical connection with write data pin 930. The computer 70 also designates particular registers in single chip computer 856 through data pin 1078 which has a common electrical connection with data pin 934 on programmable clock 908. If a particular signal from the computer 70 is directed to the single chip computer 856, the chip select pin 1076 is enabled by the computer 70. If a particular signal is directed to the programmable clock 908, the chip select pin 926 is enabled by the computer 70.

The single chip computer 856 is also provided with configuration information in accordance with prior art through pins 1080 and 1082. A memory pin 1084 is permanently grounded to disable external memory. The computer 70 resets the single chip computer 856 by a signal to reset pin 1086. In the illustrated embodiment, an inverter 1088 such as an SN74LS00N available from Texas Instruments is provided for buffering signal.

When a message is available in the single chip computer 856 for transmission to the computer 70, an interrupt signal is generated at interrupt pin 1090. In the illustrated embodiment, the line to the computer 70 from pin 1090 is provided with an inverter 1092 such as an SN74LS00N available from Texas Instruments, for buffering of the signal.

The single chip microcomputer 856 is used to accumulate messages for transmission to or reception from the SDLC chip 854 for the host computer 70. Although an SDLC type protocol is very efficient in terms of message length, any interruption in the message generates an error. Consequently, a receiving device would have to be interrupted whenever a transmission was being received or risk an error in transmission. In a guide wire communication system such as that disclosed here, the plurality of vehicles 58 attempting to send messages would generate an unacceptably high level of interrupts at a control computer 70. To avoid this problem, the disclosed circuit permits messages to be received from vehicles 58 through the SDLC chip 854 and accumulated in the single chip microcomputer 856. When the memory of the single chip microcomputer 856 has received a full compliment of data, a single interrupt to the computer can be generated from pin 1090. This procedure substantially decreases the number of interrupts generated by the system as a whole, as seen from the computer 70. Consequently, a higher volume of traffic with its associated messages can be handled on a given guide wire system.

CONTROL PROGRAM FOR DEDICATED MEMORY CIRCUIT

The single-chip computer 857 communicates with the computer 70 across the bi-directional communication lines 1056 through 1070 as described above in conjuction with the interrupt pin 1090. When a condition occurs that the single chip computer 856 needs to communicate to the host computer 70, the single chip computer 856 generates an interrupt signal at pin 1090 and concurrently sets an external status byte on lines 1056 through 1070 to a code which indicates the cause for the interrupt. In a illustrated embodiment, the status byte may change during the computer 856 and the host computer 70. A description of a possible set of values for the status byte and their meanings follows. Clearly, those skilled in the art may select different values or states without departing from the spirit of the invention.

The default condition of the status byte is null or "OOH". The single chip computer 856 generates a null whenever the attention of the host computer 70 is not required. No interrupt at pin 1090 is ever generated when a null status is maintained.

When the single chip computer 856 has received a full buffer of data for the host computer 70 and requires that the data be read by the host computer 70 to empty the buffer, the single chip microcomputer 856 generates a receive buffer full byte, "10H", in conjunction with an interrupt signal at pin 1090. This status does not indicate whether a message from a vehicle 58 is complete or if the message is longer than a single buffer in length. As the computer 70 reads the message, the single chip computer 856 will change the status byte to either buffer empty or receive complete, as more fully described below.

A status byte of receive buffer empty, "50H", indicates that there is no more data in the single chip computer 856 to send to the host computer 70. When a receive buffer empty value is given to the status byte, no interrupt at pin 1090 is generated.

Receive complete, "60H", is the value of the status byte when an end-of-message to the host computer 70 is detected by the single chip computer 856. No interrupt is generated for this status.

Just as the single chip microcomputer 856 transmits data to the host computer 70, it also receives data from the host computer 70. The stream of data transmitted from the host computer 70 through the single chip microcomputer 856 to the rest of the system, described above, may be longer than a single buffer in length. When the single chip microcomputer 856 has emptied its buffer to eight bytes of data or less, the single chip computer 856 generates a status byte indicating that the transmit buffer is nearly empty, a status of "30H". If additional data or an end of file is not received by the single chip computer 856 before the last byte has been transmitted, an error condition will result requiring re-transmission of the data.

When an end-of-file signal is detected by the single chip microcomputer 856 during a transmit operation, the microcomputer 856 sets the status byte to "transmit complete", or "20H". This status requests the host computer 70 to read the results of the transmission, that is, the check sum for error processing purposes, before moving on to another operation. If an error is detected, a re-transmission of the data stream is required.

Errors during transmission or reception can occur either at the host computer 70 or at the microcomputer 856. If the host computer detects an error condition, it can signal the microcomputer 856 to set the status byte to indicate a time out condition, "40H", indicating that the microcomputer 856 is waiting for either a reception or a transmission to start, in accordance with instructions from the host computer 70.

If the microcomputer 856 detects an error condition, the status byte is set to indicate an error by assuming a value of "FOH".

Reference is now made to FIGS. 19 through 21 wherein a program for controlling the dedicated microcomputer 856 is disclosed.

Referring now to FIG. 19, a control program generally designated 1100 is entered at start 1102 whenever a guide wire communication subsystem comprising at least one communication circuit 73 and at last one remote mobile unmanned vehicle 58 is reset. Upon entering the program 1100, certain conventional housekeeping functions 1104, such as defining variable names, and initialization 1106 are performed.

The housekeeping program 1104 accommodates the naming of a plurality of software variables and assigning memory locations thereto. Initialization 1106 comprises set up of both the dedicated microcomputer 856 and the SDLC chip 854. On the dedicated microcomputer 856, all software pointers, random access memory ("RAM") and any pending interrupt signals are cleared at step 1108. An initial set of software pointers identifying memory locations is loaded at step 1110. In addition, a signal, step 1112, is generated to reset status registers on the SDLC chip 854. Control of the program 1100 is then returned to main program 1114, the function of which will be more fully described below.

The main program 1114 comprises four parts: idle, receive transmit and error, which are enabled on the basis of the mode of the dedicated microcomputer 856. The mode is set by a command decode portion 1116 of the program 1100. The command decode program 1116 is entered 1118 from time to time in response to an interrupt signal generated by the computer 70.

References is now made to FIG. 20 wherein the command decode program 1116 is more fully described. Since the command decode program 1116 is entered in response to an interrupt signal, a first program command is a change register bank and save accumulator command 1118 to prevent the dedicated microcomputer 856 from losing program position. The command decode program 1116 then performs a data test 1122 to determine if data is present.

If data is present, the data is stored in selected registers by the dedicated microcomputer 856. The stored data would then be available to act as an argument in response to a command directed either to the dedicated microcomputer 856 or to the SDLC chip 854. When available data has been processed, the program branches to a transparent command test 1126, described below.

If data is not present, the command decode program 1116 performs a transparent command test 1126. A transparent command is a command directed from the host computer 70 through the dedicated microcomputer 856 to the SDLC chip 854.

If a transparent command is detected, a command transmission subroutine 1128 is performed. The form of the command is tested by a pre-process subroutine 1130. It is customary in the art of computer programming to test the form of data or commands prior to processing. If either incomplete data or commands or an error condition is detected, program control is customarily transferred to a selected re-start point or points or to an error subroutine. Those skilled in the art will be able to select and implement customary pre-processing tests. Consequently, further description is omitted.

The transparent command is decoded at step 1132 and a transmit command test 1134 is performed. If it is determined that a transmit data command is being directed to the SDLC chip 854, the dedicated microcomputer 856 is rendered responsive to that condition and an internal timer is started at step 1136. The function of the timer is to prevent infinite loops, long messages, or other conditions which might engage the computer 70 for such a length of time that a dangerous condition could develop in some other part of the guide wire communication system. If a selected period of time is exceed, control is returned to the main program 1114 for reprocessing. In addition to setting the status of the dedicated microcomputer 856, the program generates a command at step 1136 to the SDLC chip 854 to enable the transmit capacity of the SDLC chip 854.

After a transmission, control is returned to a portion of the program common to both transmit commands and non-transmit commands. In accordance with the decoded transparent command, the status of the dedicated microcomputer 856 is set to enable transmission of the transparent command to the SDLC chip 854. Transmission of the transparent command is noted at steps 1138 through 1142. The status or mode of the dedicated microcomputer 856 is set 1138. The transparent command is transmitted to the SDLC chip 854 and the status of the microcomputer 856 is reset 1146. Control is then returned 1146 to the main program 1114 for further processing.

In the command decode program 1116, if a transparent command condition is not detected at test 1126, the command is directed not to the SDLC chip 854 but to the dedicated microcomputer 856. A plurality of commands may be directed to the dedicated microcomputer 856 from the computer 70, and those skilled in the are will be able to select a different commands without departing from the spirit of the invention. A set of possible commands is described hereinafter in connection with a microcomputer subroutine 1148. When the microcomputer subroutine 1148 is invoked, a command received from the computer 70 is preprocessed 1150 in a similar manner to the pre-process 1130 described above. The command is tested at test 1152 and a selected action, described in commands 1154 through 1174 below, is performed.

First command 1152 instructs the dedicated microcomputer 856 to transfer data to the computer 70 byte-by-byte.

Second command 1155 instructs the dedicated microcomputer 856 to transmit a byte of data to the host 70. The byte to be transmitted represents the result of the reception of data by the dedicated microcomputer 856. By comparing this byte of data with a similar parameter calculated at the host computer 70, the computer 70 can determine if a block of data has been accurately received, as described above.

Third command 1156 instructs the dedicated microcomputer 856 to enable error checking routines. Third command 1156 is commonly used in conjunction with a fourth commmman 1158 whereby certain parameters for error checking are communicated to the dedicated micro computer 856. Those skilled in the art will be able to select a plurality of error conditions which may be selectively checked without departing from the spirit of the invention.

Fifth command 1160 is utilized to direct data reception process. This command sets the mode of the dedicated microcomputer 856 and directs the main program 1114 into a receive subroutine 1180, more fully described below.

Sixth command 1162 is used to identify the length of a transmit buffer for messages received by the dedicated microcomputer 856 from the computer 70. This command is usually employed in connection with set-up procedures described above.

Seventh command 1164 instructs the dedicated microcomputer 856 to receive data from the host for transmission through the SDLC chip 854. The seventh command 1164 sets the mode of the dedicated microcomputer 856 and causes the main program 1114 to enable a transmit subroutine-more fully described below.

Eighth command 1166 instructs the dedicated microcomputer 856 to transfer to the computer 70 a byte of data generated by the SDLC chip 854. The generated data byte represents a check sum calculated in connection with the transmission of data by the SDLC chip 854 and permits the computer 70 to verify accuracy of data transmission as described above. The eighth command 1166 is different from the second command 1155 because the SDLC chip 854 is being tested, not the dedicated microcomputer 856.

Ninth command 1168 is provided to interrupt the functioning of the dedicated microcomputer 856 by enabling a time out mode.

Tenth command 1170 disables the interrupt generated by the ninth command 1168 and permits further processing of data by the dedicated microcomputer 856.

Eleventh command 1172 instructs the dedicated microcomputer 1156 to reset the SDLC chip 854 for further data processing.

Twelfth command 1174 restores any interrupt messages which had formerly been transmitted to the computer 70. This command is used to restore a pre-existing condition when the computer 70 has overridden a request for interrupt from a dedicated microcomputer 856 for higher priority data processing.

Those skilled in the art will recognize that the selected systems commands 1154 through 1174 mentioned above are illustrative only and that other implementations, well known in the art, may be selected without departing from the spirit of the invention.

After execution of any selected command 1154 through 1174, control is returned to the main program 1114 as described in connection with return step 1146 above.

The systems commands 1154 through 1174 are effective to interrupt the flow of the main program 1114 and to set the mode of the dedicated microcomputer 856. In response to the mode state the main program 1114 is directed into one of four subroutines more fully described below with reference to FIG. 21. The subroutines comprise an idle subroutine 1178, a receive subroutine 1180, a transmit subroutine 1182 and an error subroutine 1184.

The main program 1114 is entered at start main 1176. The default condition for the main program 1114 is the idle subroutine 1178. When the dedicated microcomputer 856 is in idle mode, there is no attempt to transfer data and the main program 1114 simply loops through a test 1186 of the mode state until a different mode is detected.

The error subroutine 1184 comprises a similar loop through the mode test, but it also comprises an error message directed to the computer 70. The error message and test are performed continuously until the dedicated microcomputer 856 is reset by a systems command from the computer 70.

Detection of a receive mode by the mode test 1186 directs the main program into the receive subroutine 1180. An initial step 1188 of the receive subroutine 1180 turns off a transmitter associated with the communication circuit 73 described above, disables any interrupt messages being directed to the dedicated microcomputer 856 from the SDLC chip 854, checks the status of the SDLC chip and re-enables the interrupts.

The receive subroutine 1180 then performs a status test 1190 on the status received from the SDLC chip 854. Three conditions can be detected by the test 1190. These conditions are receive complete, receive data available, and receive in process.

If a receive complete condition is detected, a check sum 1192 is loaded into a memory location where it can be transferred on command to the computer 70, indicating the results of the reception process. The check sum 1192 is used to detect errors in data reception. A stop timer command 1194 is also generated. As mentioned above, a timer is employed to prevent endless loops and other error conditions from blocking the system.

If the test 1190 detects a receive data available condition, a read command 1196 is implemented. The read command 1196 reads data from the SDLC chip 856 and generates an interrupt signal to the computer 70 if the memory available for storing data in the dedicated microcomputer 856 is full. The read command 1196 also generates an external signal to the computer 70 indicating the dedicated microcomputer 854 has data available to send to the computer 70.

If the status test 1190 detects a receive-in-process condition, the SDLC chip 854 is not in a condition to transfer data to the dedicated microcomputer 856. The dedicated microcomputer 856, therefore, must wait for a suitable condition by performing the common steps described below.

After processing for one of the three conditions mentioned above, the receive subroutine 1180 performs certain common steps. First, the eceive subroutine 1180 tests the status of the dedicated microcomputer 856 at test 1198. If either transmission reception has been completed, or the available memory has been utilized, an empty read buffer subroutine 1200 is implemented. Otherwise, the mode of the dedicated microcomputer is tested at step 1202 to determine if the dedicated microcomputer 856 is still on the receive mode. If it is in the receive mode, the program control is transferred at 1204 to the beginning 1188 of the receive subroutine for a second processing pass. If any other status is detected, program control is returned at 1206 to step 1176 of the main program 1114.

The empty read buffer subroutine 1200 is effective to transfer the contents of memory in the dedicated microcomputer 856 to the computer 70. Transmission is commenced at step 1208. During the process of data transmission 1208, the program tests for an empty buffer condition. Until the buffer is empty, the program loops through the common steps 1198, 1202, 1204 and 1206 described above and the transmit data step 1208. When the buffer has been emptied, a flag is cleared which indicates to the host computer 70 the status of the buffer, at step 1212. The status of the SDLC chip 854 is tested at test 1214. If a message has been completely received, the status of the dedicated microcomputer 856 is set to "receive complete" at step 1216. Otherwise, the status of the dedicated microcomputer 856 is set to "buffer empty" at 1218. Program control is then returned to mode test 1202 described above.

The transmit subroutine 1182 is the fourth and final subroutine of the main program 1114. When a transmit mode is detected, the program control is directed into the transmit subroutine 1182. An initial step 1220 disables any interrupts being received by the dedicated microcomputer 856, reads the status of the SDLC chip 854 and re-enables the interrupts. The transmits subroutine then tests the SDLC status at test 1222 to determine if a transmission is in process by the SDLC chip 856. If no transmission is in progress, a mode test 1224 is performed to determine if the dedicated microprocessor 854 is still in the transmit mode. If the transmit mode is detected, a transmit command 1226 is executed directing a byte of data to be transmitted. After the byte of data is transmitted, control is returned 1228 to the beginning of the transmit subroutine 1182 at the initial step 1220. If any other mode besides the transmit mode is detected at test 1224, program control is returned to the main program 1114 at step 1176.

The SDLC status test 1222 may detect that a transmission is in progress at the SDLC ship 854. If a transmission is in progress, the program a must perform a second test 1230 to determine if a complete SDLC message, known as a "frame," has been transmitted. When the end of the frame is detected, a check sum 1232 is read to determine the results of the transmission and a stop timer command 1224 is executed. Control of the program is then returned to the mode test 1224. If the end of frame is not detected at test 1230, a status test 1236 is performed to check the status of the dedicated microcomputer 856. If data is available in the memory of the dedicated microcomputer 856, a transmit command 1238 is executed to transfer data byte wise to the SDLC chip 854. Program control is then transferred to the mode test 1224. If any other status is detected at test 1236, program control is transferred directly to mode test 1224 without attempting to transfer data at step 1238.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which some within the meaning and range of equivalency of the claims are therefore to be embraced therein.

What is claimed and desired to be secured by U.S. Letters Patent is:

1. A communication system for controlling a plurality of unmanned task-performing vehicles which are respectively caused to selectively traverse guide wire means comprising;

a plurality of unmanned task-performing vehicles, each vehicle comprising a vehicle transmitter;

vehicle traffic control means comprising transmitter means and a plurality of control receivers, each said receiver being paired with an associated receiver control means in electrical communication therewith;

each receiver control means being in electrical communication with all other receiver control means;

guide wire means along which the vehicles selectively travel, the guide wire means receiving each output message from each vehicle transmitter of each vehicle traversing the guide wire means and communicating said message to one of the control receivers and receiving each control output message from the control transmitter means and communicating said received output message from the control transmitter means to one predetermined vehicle;

the vehicle traffic control means being in electrical communication with each control receiver whereby a message received by any control receiver is communicated to the vehicle traffic control means;

each receiver control means comprising means issuing a signal selectively disabling the associated receiver upon the receipt of a signal from another receiver control means by which the system is temporarily preempted for transmission of a single message between the vehicle traffic control means and one vehicle;

thereby avoiding mixing of message with resulting errors, whereby the system accommodates infinite expansion in terms of the number of vehicles and guide wires.

2. A communication system according to claim 1 wherein the vehicle traffic control means further comprises memory means for temporarily storing messages for sequential transmission between the vehicle traffic control means and predetermined control site receivers.

3. A communication system according to claim 1 wherein at least one of the control receivers further comprises memory means for temporarily storing messages communicated between the vehicle traffic control means and that at least one control site receiver, said memory means being in electrical communication with said vehicle traffic control means and said at least one control receiver.

4. A communication system according to claim 1 further comprising memory means for storing messages to be subsequently communicated between at least one of said unmanned task-performing vehicles and the vehicle traffic control means, said memory means being in electrical communication with said at least one unmanned task-performing vehicle and vehicle transmitter of said at least one unmanned task-performing vehicle.

5. A system for controlling a plurality of unmanned task-performing guide wire related vehicles by exclusive temporary allocation of guide wire length segments whereby the travel paths and tasks performed by the vehicles are strictly controlled and conflict between vehicles is avoided, the system comprising:

a plurality of unmanned task-performing vehicles, each vehicle comprising vehicle receiver means and vehicle control means;

traffic control means by which all vehicles are controlled located at at least one vehicle-remote control site, the traffic control means comprising control transmitter means;

guide wire means defining transportation paths along which the vehicles selectively travel, the guide wire means receiving messages from the control transmitter means and communicating the messages to the vehicle receiver means;

the traffic control means further comprising means which electronically identify guide wire length segments, means which electronically identify each transportation task to be performed by any vehicle, means which correlate the transportation task and guide wire length segments needed for carrying out each transportation task, means for reserving the guide wire length segments required for completion of a specific transportation task assigned to one of said vehicles, means causing the traffic control transmitter means to communicate the specific task to the vehicle receiver of said one vehicle and to allocate the reserved guide wire length segments to said one vehicle whereupon the traffic control means cause the one vehicle to perform the specific task using the reserved guide wire length segments, means preventing the specific task and reserved guide wire length segments from being performed and made available, respectively, to a second vehicle during the performance of the specific task and utilization of the reserved guide wire length segments by the said one vehicle.

6. A system according to claim 5 wherein the traffic control means further comprise control receiver means and wherein each vehicle further comprises vehicle transmitter means in communication with the control receiver means and wherein the vehicle transmitter means comprise means which (a) selectively signal the traffic control means through the control receiver means when a specific task assigned to the vehicle with which the transmitter means is associated has been completed and (b) release to the traffic control means at least substantially all of the reserved guide wire length segments for reallocation by the traffic control means.

7. A system according to claim 6 wherein the signal and release means release all of the reserved guide wire length segments except for the length segment of the guide wire means physically occupied by the vehicle at the time of the release.

8. A system according to claim 5 further comprising memory means for temporarily storing messages to be subsequently communicated between the traffic control means and at least one control receiver menas, said memory means being in electrical communication with said traffic control means and said at least one control receiver means.

9. A system according to claim 5 further comprises memory means in electrical communication with the traffic control means for temporarily storing all non-first-in-time messages to be communicated from the traffic control means.

10. A system according to claim 5 wherein at least one unmanned task-performing vehicle further comprises memory means for temporarily storing meassages to be communicated between the at least one vehicle and the traffic control means, said memory means being in electrical communication with said unmanned task-performing vehicle and vehicle transmitter means of said vehicle.

11. A polling communication system for controlling a plurality of unmanned task-performing vehicles which are respectively caused to selectively traverse at least one path defined by guide wire means comprising:
   a plurality of unmanned task-performing vehicles, each vehicle comprising vehicle transmitter means, vehicle receiver means, and vehicle control means;
   traffic control means comprising control receiver means and control transmitter means located at at least one control site remote from the vehicles;
   guide wire means in electrical communication with the vehicle transmitter means and vehicle receiver means of each vehicle and the control receiver means and the control transmitter means, the guide wire means defining at least one path to be traversed in whole or in part by the vehicles;
   the traffic control means further comprising means by which a given task and path enablements for performing said task are exclusively delegated to a single vehicle of the system, said path enablements comprising reservation of specific length segments of the path defined by said guide wire means to the single vehicle;
   means by which a predetermined time to perform said task is set and means causing the single vehicle to be polled by the traffic control means at a point in time corresponding essentially to the predetermined time set.

12. A communication system according to claim 11 wherein the time setting means are in electrical communication, via the guide wire means, with the traffic control means but are vehicle-carried.

13. A communication system according to claim 11, wherein the traffic control means further comprises memory means for temporarily storing on a prioritized basis messages to be communicated between the traffic conrol means and any control receiver means, said memory means being in electrical communication with said traffic control means and said any control receiver means.

14. A communication system according to claim 11 wherein the control receiver means further comprises memory means for temporarily storing messages communicated between the traffic control means and said control receiver means, said memory means being in electrical communication with said vehicle traffic control means and said control receiver means.

15. A communication system according to claim 11 wherein at least one unmanned task-performing vehicle further comprises memory means for temporarily storing messages to be communicated between the at least one vehicle and the traffic control means, said memory means being in electrical communication with said unmanned task-performing vehicle and the vehicle transmitter means of said vehicle.

16. A method for controlling a plurality of unmanned task-performing vehicles which are respectively caused to selectively traverse guide wire means comprising the steps of:
   electrically connecting control receivers and receiver control means in pairs at control sites;
   electrically connecting each control receiver to guide wire means which define at least one path upon which unmanned task-performing vehicles travel;
   electrically connecting the control receivers one to the others;
   communicating, upon receipt at a selected control receiver of a message, to the receiver control means paired with said selected control receiver thereto and issuing a temporarily disabling signal from said selected paired receiver control means to all other receiver control means;
   thereby temporarily disabling all other control receivers;
   thereafter transmitting said message to a specific vehicle along the guide wire means;
   whereby inclusion of an infinite number of vehicles and guide wires is accommodated and control reception is precluded during message transmissin to a vehicle.

17. A method according to claim 16 wherein the communicating step further comprises temporarily storing said message in memory.

18. A method for controlling a plurality of unmanned task-performing computer-controlled vehicles which traverse at least part of transportation paths defined by guide wire means, comprising the steps of:
   identifying all length segments of guide wire means along which a plurality of unmanned task-performing vehicles selectively travel;
   determining each task to be performed by any of said vehicles;
   correlating said each task to be performed and the length segments available for accomplishment of said each task;

assigning to a selected single vehicle a specific task and the correlated length segments needed to accomplish the assigned specific task;

transmitting along the guide wire means to the selected single vehicle the assignment of the specific task and reserving the length segments to the selected single vehicle;

receiving said transmission from the guide wire means at receiver means carried by said single vehicle;

causing the vehicle to perform the specific assigned task using the assigned length segments on a short term basis, while preventing the assigned task from being accomplished by and the assigned length segments from being made available to a second vehicle during the performance of the assigned specific task and utilization of the assigned length segments by the selected single vehicle.

19. A method according to claim 18 further comprising notifying traffic control means through receiver means associated therewith when the task assigned to the selected vehicle has been completed; and releasing at least substantially all of the length segments for reallocation.

20. A method according to claim 19 wherein the releasing step comprises releasing all of the length segments except for the length segment physically occupied by the selected single vehicle at the time of the release.

21. A method according to claim 18 further comprising the step of temporarily storing in memory other control messages during the transmitting step.

22. A method for controlling a plurality of unmanned task-performing vehicles which are respectively caused to selectively transverse paths defined by guide wire means comprising the steps of:

exclusively electronically assigning, via a control center and guide wire means a specific task and exclusively allocating specific task-related length segments of guide wire means for performing said specific task to a selected single vehicle of the system;

electronically estimating the time required to perform said specific task; and causing a task-related status of the selected single vehicle to be electronically polled essentially at a point in time corresponding to the length of the estimated time.

23. A method according to claim 22 wherein the electronically estimating step comprises electronically estimating the time expected to be required by the selected vehicle to perform said specific task and communicating said estimate to the control center.

24. A two-way communication system for controlling a plurality of unmanned task-performing vehicles comprising:

a computer control center comprising transmitter means, control means and receiver means;

a plurality of unmanned task-performing vehicles remote from the computer control center, each vehicle comprising transmitter means and receiver means;

guide wire means defining a plurality of paths which are selectively traversed by the vehicles, the guide wire means comprising means for transmitting messages to each vehicle and the computer control center;

means disabling all messages and signal transmissions and receptions from said vehicle to the computer control center when the computer control center transmitter means are transmitting a task-related message to a specific vehicle.

25. A two-way communication system according to claim 24 wherein the computer control center transmitter means transmits each message intended for a single vehicle globally to all vehicles and wherein each vehicle comprises means causing all vehicles to ignore said global message except for said single vehicle.

26. A two-way communication system according to claim 24 wherein each vehicle comprises means which inhibit the associated vehicle transmitter means except when vehicle transmission is responsive to computer control center polling of said specific vehicle.

27. A two-way communication system according to claim 26 wherein the computer control center comprises means which cause vehicles to be polled sequentially whereby the vehicles so polled to respond sequentially.

28. A two-way communication system according to claim 24 comprising disable/enable means by which the vehicle transmitter means of each vehicle are disabled when the associated vehicle receiver means are operating and by which the vehicle receiver means of each vehicle are disabled when the associated vehicle transmitter means are operating.

29. A two-way communication system according to claim 24 wherein the computer control center comprises time estimating means to estimate the length of time needed by the specific vehicle to perform each assigned task and further comprising means which poll the status of the specific vehicle at the end of said estimated length of time.

30. A two-way communication system according to claim 24 further comprising means which electronically define length segments of the guide wire means and which electronically identify and exclusively reserve to the specific vehicle all guide wire length segments needed to complete an assigned task until the assigned task is completed.

31. A two-way communication system according to claim 24 wherein said computer control center further comprises means which normally inhibit transmission of duplicate computer control center messages and means which cause a duplicate computer control center message to be transmitted only when the original message is not acknowledged by the vehicle for which it was intended.

32. A two-way communication system according to claim 29 further comprising computer control center message memory wherein messages to be transmitted to selected vehicles are stored for sequential delivery to the contrl transmitter means.

* * * * *